(12) United States Patent
Ramaswamy et al.

(10) Patent No.: US 11,765,406 B2
(45) Date of Patent: Sep. 19, 2023

(54) SYSTEMS AND METHODS FOR SELECTIVE OBJECT-OF-INTEREST ZOOMING IN STREAMING VIDEO

(71) Applicant: INTERDIGITAL MADISON PATENT HOLDINGS, SAS, Paris (FR)

(72) Inventors: Kumar Ramaswamy, Princeton, NJ (US); Jeffrey Allen Cooper, Rocky Hill, NJ (US); John Richardson, Lake Forest, IL (US); Ralph Neff, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/486,434

(22) PCT Filed: Feb. 17, 2018

(86) PCT No.: PCT/US2018/018540
§ 371 (c)(1),
(2) Date: Aug. 15, 2019

(87) PCT Pub. No.: WO2018/152437
PCT Pub. Date: Aug. 23, 2018

(65) Prior Publication Data
US 2020/0014961 A1 Jan. 9, 2020

Related U.S. Application Data

(60) Provisional application No. 62/460,651, filed on Feb. 17, 2017.

(51) Int. Cl.
*H04N 21/234* (2011.01)
*G06F 3/04845* (2022.01)
(Continued)

(52) U.S. Cl.
CPC .... *H04N 21/23418* (2013.01); *G06F 3/04842* (2013.01); *G06F 3/04845* (2013.01); *G06F 3/04883* (2013.01); *H04N 21/440263* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS 5,610,653 A    3/1997  Abecassis
5,892,554 A    4/1999  Dicicco
(Continued)

FOREIGN PATENT DOCUMENTS

CA    2936318        8/2015
CN    101313578 A    11/2008
(Continued)

OTHER PUBLICATIONS

Loungev Films, "HD 1080p—Nature Scenery Video". YouTube link available at: www.youtube.com/watch?v=DQuhA5ZCV9M, published on Jan. 13, 2016, 3 pages.
(Continued)

*Primary Examiner* — Hung Q Dang
(74) *Attorney, Agent, or Firm* — Smadar Gefen

(57) ABSTRACT

Systems and methods are described for enabling a consumer of streaming video to obtain different views of the video, such as zoomed views of one or more objects of interest. In an exemplary embodiment, a client device receives an original video stream along with data identifying objects of interest and their spatial locations within the original video. In one embodiment, in response to user selection of an object of interest, the client device switches to display of a cropped and scaled version of the original video to present a zoomed video of the object of interest. The zoomed video tracks the selected object even as the position of the selected
(Continued)

object changes with respect to the original video. In some embodiments, the object of interest and the appropriate zoom factor are both selected with a single expanding-pinch gesture on a touch screen.

20 Claims, 18 Drawing Sheets

(51) Int. Cl.
G06F 3/04883 (2022.01)
H04N 21/4402 (2011.01)
G06F 3/04842 (2022.01)
H04N 21/2343 (2011.01)
H04N 21/236 (2011.01)
H04N 21/4728 (2011.01)
H04N 21/845 (2011.01)

(56) References Cited

U.S. PATENT DOCUMENTS

| | | | |
|---|---|---|---|
| 6,282,713 B1 | 8/2001 | Kitsukawa | |
| 6,750,919 B1 | 6/2004 | Rosser | |
| 6,973,130 B1* | 12/2005 | Wee | G06T 9/20 |
| | | | 375/240.08 |
| 7,079,176 B1 | 7/2006 | Freeman | |
| 7,114,174 B1 | 9/2006 | Brooks | |
| 7,117,517 B1 | 10/2006 | Milazzo | |
| 7,343,617 B1 | 3/2008 | Katcher | |
| 7,577,980 B2 | 8/2009 | Kienzle | |
| 7,782,344 B2 | 8/2010 | Whittaker | |
| 7,949,032 B1 | 5/2011 | Frost | |
| 8,055,785 B2 | 11/2011 | Liu | |
| 8,160,077 B2 | 4/2012 | Traversat | |
| 8,243,797 B2 | 8/2012 | Lin | |
| 8,331,760 B2 | 12/2012 | Butcher | |
| 8,621,000 B2 | 12/2013 | Adimatyam | |
| 8,705,527 B1 | 4/2014 | Addepalli | |
| 9,047,236 B2 | 6/2015 | Gigliotti | |
| 9,060,187 B2 | 6/2015 | Wu | |
| 9,064,313 B2 | 6/2015 | Seshadrinathan | |
| 9,137,027 B2 | 9/2015 | Matthews | |
| 9,137,558 B2 | 9/2015 | Gibbon | |
| 9,170,707 B1 | 10/2015 | Laska | |
| 9,177,225 B1 | 11/2015 | Cordova-Diba | |
| 9,218,641 B1 | 12/2015 | Ellis | |
| 9,231,838 B2 | 1/2016 | Ould-Brahim | |
| 9,288,545 B2 | 3/2016 | Hill | |
| 9,317,688 B2 | 4/2016 | Yegin | |
| 9,336,060 B2 | 5/2016 | Nori | |
| 9,344,888 B2 | 5/2016 | Starsinic | |
| 9,380,623 B2 | 6/2016 | Kim | |
| 9,515,372 B2 | 12/2016 | Chang | |
| 9,992,553 B2 | 6/2018 | Bennett | |
| 10,152,826 B2 | 12/2018 | Saito | |
| 10,530,757 B2 | 1/2020 | Seed et al. | |
| 11,122,027 B2 | 9/2021 | Seed et al. | |
| 2002/0056136 A1 | 5/2002 | Wistendahl | |
| 2002/0059588 A1 | 5/2002 | Huber | |
| 2002/0065678 A1 | 5/2002 | Peliotis | |
| 2002/0120931 A1 | 8/2002 | Huber | |
| 2002/0120934 A1 | 8/2002 | Abrahams | |
| 2002/0126990 A1 | 9/2002 | Rasmussen | |
| 2002/0131511 A1 | 9/2002 | Zenoni | |
| 2002/0133817 A1 | 9/2002 | Markel | |
| 2002/0147987 A1 | 10/2002 | Reynolds | |
| 2002/0174425 A1 | 11/2002 | Markel | |
| 2003/0028873 A1 | 2/2003 | Lemmons | |
| 2003/0149983 A1 | 8/2003 | Markel | |
| 2004/0031062 A1 | 2/2004 | Lemmons | |
| 2004/0032495 A1 | 2/2004 | Ortiz | |
| 2004/0190779 A1 | 9/2004 | Sarachik | |
| 2005/0093976 A1 | 5/2005 | Valleriano | |
| 2005/0286466 A1 | 12/2005 | Tagg | |
| 2006/0155842 A1 | 7/2006 | Yeung et al. | |
| 2006/0193295 A1 | 8/2006 | White | |
| 2007/0024706 A1 | 2/2007 | Brannon, Jr. | |
| 2007/0042784 A1 | 2/2007 | Anderson | |
| 2007/0077943 A1 | 4/2007 | Hamilla | |
| 2007/0086669 A1 | 4/2007 | Berger | |
| 2007/0101418 A1 | 5/2007 | Wood | |
| 2007/0104369 A1 | 5/2007 | Weatherhead | |
| 2007/0153739 A1 | 7/2007 | Zheng | |
| 2007/0171921 A1 | 7/2007 | Wookey | |
| 2007/0226761 A1 | 9/2007 | Zalewski | |
| 2008/0077965 A1 | 3/2008 | Kamimaki | |
| 2008/0127253 A1 | 5/2008 | Zhang | |
| 2008/0134305 A1 | 6/2008 | Hinton | |
| 2008/0225116 A1 | 9/2008 | Kang | |
| 2008/0261711 A1 | 10/2008 | Tuxen | |
| 2009/0002564 A1 | 1/2009 | Barnhoefer | |
| 2009/0003718 A1 | 1/2009 | Liu | |
| 2009/0007023 A1 | 1/2009 | Sundstrom | |
| 2009/0046152 A1 | 2/2009 | Aman | |
| 2009/0047902 A1 | 2/2009 | Nory | |
| 2009/0201917 A1 | 8/2009 | Maes | |
| 2009/0217339 A1 | 8/2009 | Kim | |
| 2009/0220080 A1 | 9/2009 | Herne | |
| 2009/0225164 A1 | 9/2009 | Renkis | |
| 2009/0276805 A1 | 11/2009 | Andrews, II | |
| 2009/0300692 A1 | 12/2009 | Mavlankar | |
| 2009/0305708 A1 | 12/2009 | Matsui | |
| 2009/0316795 A1 | 12/2009 | Chui | |
| 2009/0322489 A1 | 12/2009 | Jones | |
| 2010/0097221 A1 | 4/2010 | Kreiner | |
| 2010/0188531 A1 | 7/2010 | Cordes | |
| 2010/0232504 A1 | 9/2010 | Feng | |
| 2010/0321389 A1 | 12/2010 | Gay | |
| 2011/0013836 A1 | 1/2011 | Gefen | |
| 2011/0016321 A1 | 1/2011 | Sundaram | |
| 2011/0113480 A1 | 5/2011 | Ma | |
| 2011/0145430 A1 | 6/2011 | Ha | |
| 2011/0231653 A1 | 9/2011 | Bollay | |
| 2011/0299832 A1 | 12/2011 | Butcher | |
| 2011/0304772 A1 | 12/2011 | Dasher | |
| 2012/0030637 A1 | 2/2012 | Dey | |
| 2012/0047551 A1 | 2/2012 | Pattar | |
| 2012/0062732 A1* | 3/2012 | Marman | H04N 7/18 |
| | | | 348/142 |
| 2012/0072952 A1 | 3/2012 | Vaysman | |
| 2012/0078712 A1 | 3/2012 | Fontana | |
| 2012/0117140 A1 | 5/2012 | Wang | |
| 2012/0195574 A1 | 8/2012 | Wallace | |
| 2013/0003576 A1 | 1/2013 | Segura | |
| 2013/0016910 A1 | 1/2013 | Murata | |
| 2013/0031582 A1 | 1/2013 | Tinsman | |
| 2013/0036442 A1 | 2/2013 | Wingert | |
| 2013/0050268 A1 | 2/2013 | Lohrenz | |
| 2013/0061262 A1 | 3/2013 | Briggs | |
| 2013/0065622 A1 | 3/2013 | Hwang | |
| 2013/0091430 A1 | 4/2013 | Zhai | |
| 2013/0091515 A1 | 4/2013 | Sakata | |
| 2013/0142118 A1 | 6/2013 | Cherian | |
| 2013/0155106 A1 | 6/2013 | Rolleston | |
| 2013/0155847 A1 | 6/2013 | Li | |
| 2013/0163507 A1 | 6/2013 | Hoshino | |
| 2013/0167062 A1* | 6/2013 | Herring | G06F 3/04883 |
| | | | 715/773 |
| 2013/0188503 A1 | 7/2013 | Anepu | |
| 2013/0188515 A1 | 7/2013 | Pinheiro | |
| 2013/0223339 A1 | 8/2013 | Nakahara | |
| 2013/0246784 A1 | 9/2013 | Zhang | |
| 2013/0266286 A1 | 10/2013 | Yu et al. | |
| 2013/0312042 A1 | 11/2013 | Venson | |
| 2013/0336305 A1 | 12/2013 | Yan | |
| 2013/0342539 A1 | 12/2013 | Khan | |
| 2014/0022074 A1 | 1/2014 | Balinski | |
| 2014/0026052 A1 | 1/2014 | Thorwirth | |
| 2014/0029462 A1 | 1/2014 | Stewart | |
| 2014/0033074 A1 | 1/2014 | Thibaux | |
| 2014/0045452 A1 | 2/2014 | Ma | |
| 2014/0059457 A1* | 2/2014 | Min | G06F 3/04883 |
| | | | 715/764 |

(56) References Cited

U.S. PATENT DOCUMENTS

| | | |
|---|---|---|
| 2014/0082054 A1 | 3/2014 | Denoual |
| 2014/0086217 A1 | 3/2014 | Park |
| 2014/0089990 A1 | 3/2014 | Van Deventer |
| 2014/0168056 A1 | 6/2014 | Swaminathan |
| 2014/0192204 A1 | 7/2014 | Glazer |
| 2014/0195918 A1 | 7/2014 | Friedlander |
| 2014/0204206 A1 | 7/2014 | Itoi |
| 2014/0204247 A1 | 7/2014 | Bilgen |
| 2014/0210714 A1 | 7/2014 | Kang |
| 2014/0215043 A1 | 7/2014 | Ryu |
| 2014/0245367 A1 | 8/2014 | Sasaki |
| 2014/0269581 A1 | 9/2014 | Song |
| 2014/0269932 A1 | 9/2014 | Su |
| 2014/0279068 A1 | 9/2014 | Systrom |
| 2014/0280781 A1 | 9/2014 | Gregotski |
| 2014/0282751 A1 | 9/2014 | Lee |
| 2014/0282909 A1 | 9/2014 | Cherian |
| 2015/0016504 A1 | 1/2015 | Auyeung |
| 2015/0032901 A1 | 1/2015 | Wang |
| 2015/0033312 A1 | 1/2015 | Seed |
| 2015/0062339 A1 | 3/2015 | Ostrom |
| 2015/0070587 A1 | 3/2015 | Emeott |
| 2015/0089023 A1 | 3/2015 | Phillips |
| 2015/0089072 A1 | 3/2015 | Phillips |
| 2015/0104155 A1 | 4/2015 | Bloch |
| 2015/0117229 A1 | 4/2015 | Avudainayagam |
| 2015/0145782 A1* | 5/2015 | Brown ............ G06F 3/04883 345/173 |
| 2015/0172775 A1 | 6/2015 | Yee |
| 2015/0179219 A1 | 6/2015 | Gao |
| 2015/0201222 A1 | 7/2015 | Mertens |
| 2015/0208103 A1 | 7/2015 | Guntur |
| 2015/0222815 A1 | 8/2015 | Wang |
| 2015/0264096 A1 | 9/2015 | Swaminathan |
| 2015/0268822 A1 | 9/2015 | Waggoner |
| 2015/0296250 A1 | 10/2015 | Casper |
| 2015/0341091 A1 | 11/2015 | Park |
| 2015/0348247 A1 | 12/2015 | McLaughlin |
| 2015/0350659 A1 | 12/2015 | Auyeung |
| 2015/0351084 A1 | 12/2015 | Werb |
| 2015/0382268 A1 | 12/2015 | Hampel |
| 2016/0042496 A1 | 2/2016 | Ichimi |
| 2016/0057494 A1 | 2/2016 | Hwang |
| 2016/0073106 A1 | 3/2016 | Su |
| 2016/0156949 A1 | 6/2016 | Hattori |
| 2016/0165309 A1 | 6/2016 | Van Brandenburg |
| 2016/0182593 A1* | 6/2016 | Denoual ............ H04L 65/762 709/219 |
| 2016/0192433 A1 | 6/2016 | Deenoo |
| 2016/0217623 A1 | 7/2016 | Singh |
| 2016/0249269 A1 | 8/2016 | Niu |
| 2016/0249353 A1 | 8/2016 | Nakata |
| 2016/0253240 A1 | 9/2016 | Cocagne |
| 2016/0269771 A1 | 9/2016 | Bangma |
| 2016/0306036 A1 | 10/2016 | Johnson |
| 2016/0360172 A1 | 12/2016 | Tao |
| 2016/0360235 A1 | 12/2016 | Ramasubramonian |
| 2016/0364087 A1 | 12/2016 | Thompson |
| 2016/0366454 A1 | 12/2016 | Tatourian |
| 2017/0070735 A1 | 3/2017 | Ramasubramonian |
| 2017/0118540 A1* | 4/2017 | Thomas ............ H04N 21/2343 |
| 2017/0136948 A1 | 5/2017 | Sypitkowski |
| 2017/0163645 A1 | 6/2017 | Bradley et al. |
| 2017/0212583 A1 | 7/2017 | Krasadakis |
| 2017/0236288 A1* | 8/2017 | Sundaresan ............ G06T 7/20 382/173 |
| 2017/0302719 A1* | 10/2017 | Chen ............ H04L 65/4069 |
| 2018/0098063 A1 | 4/2018 | Chen |
| 2018/0332632 A1 | 11/2018 | Vikberg |
| 2018/0343043 A1 | 11/2018 | Hakola |
| 2019/0036910 A1 | 1/2019 | Choyi |
| 2019/0320189 A1 | 10/2019 | Cooper |
| 2020/0014961 A1 | 1/2020 | Ramaswamy |
| 2021/0130629 A1 | 5/2021 | Suzuki |

FOREIGN PATENT DOCUMENTS

| | | |
|---|---|---|
| CN | 101331735 A | 12/2008 |
| CN | 101350923 A | 1/2009 |
| CN | 102238547 A | 11/2011 |
| CN | 102752877 A | 10/2012 |
| CN | 102907068 A | 1/2013 |
| CN | 102939573 A | 2/2013 |
| CN | 103190089 A | 7/2013 |
| CN | 103336663 A | 10/2013 |
| CN | 104012106 A | 8/2014 |
| CN | 104052788 A | 9/2014 |
| CN | 104092488 A | 10/2014 |
| CN | 104220975 A | 12/2014 |
| CN | 105103566 A | 11/2015 |
| CN | 105144727 A | 12/2015 |
| CN | 105264904 A | 1/2016 |
| CN | 105373331 A | 3/2016 |
| CN | 106023261 A | 10/2016 |
| CN | 106233745 A | 12/2016 |
| CN | 106416223 A | 2/2017 |
| EP | 1175785 A1 | 1/2002 |
| EP | 1443768 A1 | 8/2004 |
| EP | 2426645 A1 | 3/2012 |
| EP | 2530675 A2 | 12/2012 |
| EP | 2824883 A1 | 1/2015 |
| EP | 2824885 | 1/2015 |
| EP | 2882110 A1 | 6/2015 |
| EP | 2919471 | 9/2015 |
| EP | 3076672 A1 | 10/2016 |
| EP | 3110160 A1 | 12/2016 |
| EP | 2408196 | 1/2017 |
| JP | 2004104351 A | 4/2004 |
| JP | 2007192988 A | 8/2007 |
| JP | 2009207114 | 9/2009 |
| JP | 2013522965 A | 6/2013 |
| JP | 2014525191 A | 9/2014 |
| JP | 2014530534 A | 11/2014 |
| JP | 6313503 B1 | 4/2018 |
| KR | 20080041237 A | 5/2008 |
| KR | 20100065327 A | 6/2010 |
| KR | 20140043532 A | 4/2014 |
| KR | 20140098156 A | 8/2014 |
| KR | 20160021141 A | 2/2016 |
| KR | 20170128515 A | 11/2017 |
| WO | 2001018658 A1 | 3/2001 |
| WO | 2010021705 | 2/2010 |
| WO | 2010021705 A1 | 2/2010 |
| WO | 2011082150 A1 | 7/2011 |
| WO | 2012021246 | 2/2012 |
| WO | 2012114666 A1 | 8/2012 |
| WO | 2012141557 A2 | 10/2012 |
| WO | 2013142966 A1 | 10/2013 |
| WO | 2014057131 | 4/2014 |
| WO | 2014067566 | 5/2014 |
| WO | 2014111423 A1 | 7/2014 |
| WO | 2014183803 A1 | 11/2014 |
| WO | 2014190308 A1 | 11/2014 |
| WO | 2015013645 A1 | 1/2015 |
| WO | 2015013685 A1 | 1/2015 |
| WO | 2015014773 A1 | 2/2015 |
| WO | 2015059194 A1 | 4/2015 |
| WO | 2015122737 A1 | 8/2015 |
| WO | 2015130796 | 9/2015 |
| WO | 2015197815 A1 | 12/2015 |
| WO | 2016040290 A1 | 3/2016 |
| WO | 2016040833 A1 | 3/2016 |
| WO | 2016098056 A1 | 6/2016 |
| WO | 2017061297 | 4/2017 |
| WO | 2017196670 A1 | 11/2017 |

OTHER PUBLICATIONS

Flowplayer—"Bandwidth Detection". Web Archived dated Dec. 24, 2016. Retrieved from http://web.archive.org/web/20161224034909/http://flash.flowplayer.org/plugins/streaming/bwcheck.html.
International Preliminary Report on Patentability for PCT/US2018/020229 dated Sep. 10, 2019, 12 pages.

(56) References Cited

OTHER PUBLICATIONS

International Organization for Standardization, "Information Technology—Dynamic Adaptive Streaming Over HTTP (DASH), Part 1: Media Presentation Description and Segment Formats/ Amendments 2: Spatial Relationship Description, Generalized URL Parameters and Other Extensions". International Standard, ISO/IEC 23009-1:2015/FDAM 2:2015(E), Second Edition (Annex H), Feb. 25, 2015, 23 pages.

IBC, "D-Zero—Low Latency ABR Streaming". Sky Italia, available at: http://www.ibc.org/ibc-awards/ibc2016-innovation-award-entrants/ibc-innovation-award-for-content-delivery--2016-entrants, Sep. 2016.

IBC, "True live OTT Solution Puts F1 in Pole Position". Tata Communications, available at: http://www.ibc.org/ibc-awards/ibc2016-innovation-award-entrants/ibc-innovation-award-for-content-delivery--2016-entrants, Sep. 2016.

SYE, "SYE". Web Archive dated Sep. 5, 2016, available at: https://netinsight.net/start/technical-offer-sye/, 1 page.

Sun, Lei, et. al., "The Dynamic Videobook: A Hierarchical Summarization for Surveillance Video". IEEE International Conference on Image Processing, (2013), pp. 3963-3966.

TATACOMMS . "Transforming media + entertainment (subtitles)". Youtube link dated Sep. 10, 2015, available at: https://w,w.youtube.com/watch?v=KUxxPYocMiw, 19 pages.

Tata Communications, "Media and Entertainment Services". Tata Communications, Archived on Feb. 27, 2017. Retrieved from https://web.archive.org/web/20170217212843/https://www.tatacommunications.com/products-services/enterprises/media-entertainment-services, 1 page.

International Search Report and Written Opinion of the International Searching Authority for PCT/US2018/018540 dated Apr. 6, 2018.

Mavlankar, A. et. al., "An Interactive Region-Of-Interest Video Streaming System for Online Lecture Viewing". Proceedings of 2010 IEEE 18th International Packet Video Workshop Dec. 13-14, 2010, pp. 64-68.

Written Opinion of the International Preliminary Examining Authority for PCT/US2018/018540 dated Jan. 18, 2019, 7 pages.

International Preliminary Report on Patentability for PCT/US2018/018540 completed Apr. 26, 2019, 7 pages.

Mavlankar, A. et. al., "Video Streaming with Interactive Pan/Tilt/Zoom", Oct. 2009. Available at: http://web.stanford.edu/~bgirod/pdfs/Mavlankar_Girod_Chapter_Oct09.pdf.

Mavlankar, A., et al., "An Interactive Region-of-Interest Video Streaming System for Online Lecture Viewing". Proceedings of 2010 IEEE 18th International Packet Video Workshop, Dec. 13-14, 2010, pp. 64-71.

International Search Report and The Written Opinion of the International Searching Authority for PCT/US2016/046317, dated Oct. 19, 2016, 11 pages.

International Preliminary Report on Patentability for PCT/US2016/046317 dated Mar. 1, 2018.

International Organization for Standardization, "Information Technology—Dynamic adaptive Streaming Over HTTP (DASH)—Part 3: Implementation Guidelines/AMD 1: Alignment with ISO/IEC 23009-1:2014 and Extensibility". International Standard, ISO/IEC JTC 1/SC 29N, ISO/IEC TR 23009-3:2014/PDAM1, ISO/IEC JTC 1/SC 29/WG11, No. N15990, Mar. 2, 2016, 49 pages.

International Search Report and Written Opinion of the International Searching Authority for PCT/US2017/040060 dated Sep. 11, 2017, 15 pages.

Wang, X., et. al., "Multi-Stream Streaming in DASH (Multi-Stream DASH)". Huawei Technology, LTD., Motion Picture Expert Group (MPEG) Meeting, No. m35885, Feb. 2015, 8 pages.

International Preliminary Report on Patentability for PCT/US2017/040060 dated Jan. 1, 2019.

International Search Report and Written Opinion of The International Searching Authority for PCT/US2017/026388 dated Jul. 24, 2017, 14 Pages.

Written Opinion of the International Preliminary Examining Authority for PCT/US2017/026388 dated Mar. 5, 2018.

International Preliminary Report on Patentability for PCT/US2017/026388 completed on Jul. 12, 2018.

Yilmaz, A., et. al., "Object Tracking—A Survey". ACM Computing Surveys, vol. 38, No. 4, Article 13, Dec. 2006, pp. 1-45.

International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.

Lavigne, F., "Automatic Video Zooming for Sport Team Video Broadcasting on Smart Phones". Available at: http://tcts.fpms.ac.be/publications/papers/2010/visapp2010_flfcxd.pdf, (2010), 7 pages.

Written Opinion of the International Preliminary Examining Authority for PCT/US2016/053512 dated Aug. 28, 2017.

International Preliminary Report on Patentability, Corrected Version, for PCT/US2016/053512 completed Jan. 15, 2018.

International Preliminary Report on Patentability for PCT/US2016/053512 completed Jan. 15, 2018.

Mavlankar, A., et. al., "Optimal Slice Size for Streaming Regions of High Resolution Video with Virtual Pan/Tilt/Zoom Functionality", Jun. 2007. Available at: http://web.stanford.edu/~bgirod/pdfs/MavlankarEUSIPCO07.pdf.

International Search Report and Written Opinion of the International Searching Authority for PCT/US2016/053512, dated Nov. 28, 2016, 10 pages.

Notification of Transmittal of the International Search Report and the Written Opinion of the International Searching Authority, or the Declaration for PCT/US2017/031335 dated Jul. 19, 2017, 16 pages.

Giladi, A. et. al., "Use Cases for Conveying Source Information". International Organization for Standardization Coding of Moving Pictures and Audio, ISO/IEC JTC1/SC29/WG11, m31594, Oct. 2013, 3 pages.

Liu S., et al, "SVC Inter-Layer Prediction for SVC Bit-Depth Scalability". Joint Video Team Of ISO/IEC JTC1/SC29/WG11 and ITU-T SG.1624, No. JVT-X075, Jun. 2007, 12 pages.

International Search Report and Written Opinion of the International Searching Authority for PCT/US2017/041142 dated Oct. 11, 2017.

Written Opinion of the International Preliminary Examining Authority for PCT/US2017/031335 dated Apr. 5, 2018.

Written Opinion of the International Preliminary Examining Authority for PCT/US2017/041142 dated Jun. 20, 2018.

International Preliminary Report on Patentability for PCT/US2017/031335 completed on Jun. 26, 2018.

International Preliminary Report on Patentability for PCT/US2017/041142 completed on Sep. 19, 2018.

Mantiuk, R., et. al., "Display Adaptive Tone Mapping". ACM Transactions on Graphics (TOG), vol. 27, No. 3, Aug. 2008, available at: http://resources.mpi-inf.mpg.de/hdr/datmo/mantiuk08datm.pdf, 10 pages.

Unifore Security, "What's ROI (Region of Interest) Video Surveillance Technology?". Unifore.net, Oct. 23, 2015, 4 pages.

Mavlankar, A., et. al., "Peer-To-Peer Multicast Live Video Streaming with Interactive Virtual Pan/Tilt/Zoom Functionality". In 2008 15th IEEE International Conference on Image Processing, Oct. 2008, pp. 2296-2299.

Chen, Y., et. al., "Intra-And-Inter-Constraint-Based Video Enhancement Based On Piecewise Tone Mapping". IEEE Transactions on Circuits and Systems for Video Technology, vol. 23, No. 1, Jan. 2013, pp. 74-82.

Vehkaperä, J., et. al., "Replacing Picture Regions in H. 264/AVC Bitstream By Utilizing Independent Slices". Proceedings of 2010 IEEE 17th International Conference on Image Processing, Sep. 26-29, 2010, pp. 3397-3400.

ClassXteam, "ClassX Mobile". You Tube Link, published on May 8, 2011, available at: https://www.youtube.com/watch?v=Kul-oCw4hj8.

International Telecommunication Union, "Advanced Video Coding for Generic Audiovisual Services". Series H: Audiovisual and Multimedia Systems, ITU-T, H.264, Feb. 2014, 790 pages.

(56) References Cited

OTHER PUBLICATIONS

Ubuntu, "Display Adaptive Tone Mapping". Ubuntu Manuals, available at: <http://manpages.ubuntu.com/manpages/xenial/en/man1/pfstmo_mantiuk08.1.html, (2010), 7pages.
Invitation to pay additional Fees for PCT/US2018/020229, issued by the International Searching Authority, and dated Jun. 8, 2018, 14 pages.
International Search Report and Written Opinion of the International Searching Authority for PCT/US2018/020229 dated Jul. 31, 2018, 18 pages.
Brandenburg, R., et., al., "Immersive Second-Screen Experiences Using Hybrid Media Synchronization". Media Synchronization Workshop, (2013), 7 pages.
HBB Next, "Immersive Second Screen Synchronization". HBB Next, Next Generation Hybrid Media, Applications, available at: http://www.mediafutureweek.nl/wp-content/uploads/2014/05/poster_IBC_2013_applications.pdf, (2013), 1 page.
Niamut, O.A., et. al., "Live Event Experiences—Interactive UHDTV On Mobile Devices". IBC2014 Conference, Sep. 11-15, 2014, 8 pages.
Lindgren, P., et., al., "How True, Synchronized Live OTT Can Change the Second Screen and Social TV Game". IBC2016 Conference, Sep. 8-12, 2016, pp. 1-8.
Richardson, Iain E., et. al., "The H.264 Advanced Video Compression Standard, Chapter 10: Extensions and Directions". John Wiley, Second Edition, (2010), pp. 287-311.
Shibata, F., et. al., "A View Management Method for Mobile Mixed Reality Systems". In Virtual Environments 2008: 14th Eurographics Symposium on Virtual Env., May 29-30, 2008, 8 pages.
International Search Report and Written Opinion of the International Searching Authority for PCT/US2017/043248 dated Oct. 5, 2017.
Written Opinion of the International Preliminary Examining Authority for PCT/US2017/043248 dated Jun. 28, 2018.
International Preliminary Report on Patentability for PCT/US2017/043248 completed Sep. 27, 2018.
Taylor, T. "NFL using Zebra RFID Chips to Track Player Movements, Gather Data". Sports Illustrated article, available at: http://web.archive.org/web20160703053654/http://www.si.com:80/, updated Mar. 6, 2015, 4 pages.
Zebra, "Zebra and the NFL: Change the Game". Zebra.com article, available at: http://web.archive.org/web/20160604013821/https://www.zebra.com/us/en/nfl.html, web archive dated Jun. 4, 2016, 4 pages.
Sheikh Y., et. al., "Geodetic Alignment of Aerial Video Frames". In Shah M., Kumar R. (eds) Video Registration, Chapter 7, (2003), pp. 141-177.
"NASCAR Pointer Screen Capture", retrieved from video available at: http://www.sportvision.com/media/pointers, on Jul. 8, 2016, 1 page.
Aberdeen, "Case Study: FCC Challenges Video Editors to Make Room for Caption Placement", Aug. 4, 2015, 3 pages.
Intel Corporation, "Overview of new radio access technology requirements and designs", 3GPP Tdoc R1-162379, 3GPP TSG RAN WG1 Meeting #84bis, Busan, Korea, Apr. 11-15, 2016, 4 pages.
ETSI TS 102690 V1.1.1, Machine-to-Machine Communications (M2M), "Functional Architecture" Oct. 2011, 280 pages.
European Telecommunications Standards Institute (ETSI / TS 102 690 V1.2.1; Machine-to-Machine Communications (M2M); Functional Architecture, Jun. 2013, 279 pages.
Qualcomm incorporated S2-162339 "Solution for key issue 1 on network slicing : network slice and network functions selection based on evolved eDeCOR model" S2-162339, SA WG2 Meeting #115, May 23-27, 2016, Nanjing, P.R. China (7 pages).
ZTE: "Considerations on channel access procedure for NR-U", 3GPP Draft; R2-1811281 Considerations on Random Access Procedure for NR-U, 3rd Generation Partnership Project (3GPP), Mobile Competence Centre ; 650, Route Des Lucioles ; F-06921 Sophia-Antipolis Cedex ; France, vol. RAN WG2, No. Gothenburg, Sweden; Aug. 20, 2018-Aug. 24, 2018 Aug. 9, 2018, (Aug. 9, 2018), XP051520945.
Huawei et al: "Numerology and wideband operation in NR unlicensed", 3GPP Draft; R1-1803677, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2018 Apr. 15, 2018 (Apr. 15, 2018), XP051425974.
Nokia et al: "Feature Lead's Summary on Channel Access Procedures" 3GPP Draft; R1-1809801 NRCJ Channel Access Summary, 3rd Generation Partnership Project (3GPP), Mobile Competence Centre ; 650, Route Des Lucioles ; F-06921 Sophia-Antipolis Cedex ; France, vol. RAN WG1, No. Gothenburg, Sweden; Aug. 20, 2018-Aug. 20, 2018 Aug. 23, 2018 (Aug. 23, 2018),XP051517160.
Huawei et al: "Initial access in NR unlicensed", 3GPP Draft; R1-1808062, 3rd Generation Partnership Project (3GPP),Mobile Competence Centre ; 650, Route Des Lucioles F-06921 Sophia-Antipolis Cedex ; France, vol. RAN W1I, No. Gothenburg, Sweden; Aug. 20, 2018-Aug. 24, 2018 Aug. 10, 2018 (Aug. 10, 2018), XP051515466.
European Telecommunications Standards Institute (ETSI), TS 102 690 V2.1.1, Technical Specification, Machine-to-Machine Communications (M2M); Functional Architecture, Oct. 2013, 332 pages.
OneM2M Technical Specification, oneM2M-TS-0001 oneM2M Functional Architecture-V-0.0.7, oneM2M Functional Architecture, Aug. 26, 2013, 43 pages.
Third Generation Partnership Project, "Technical Specification Group Radio Access Network; Feasibility study for Further Advancements for E-UTRA (LTE-Advanced) (Release 13)," 3GPP TR 36.912 V13.0.0, Dec. 2015 (62 pages).
Third Generation Partnership Project, "Technical Specification Group Radio Access Network; Study on Elevation Beamforming / Full-Dimension (FD) Multiple Input Multiple Output (MIMO) for LTE" (Release 13), 3GPP TR 36.897 V13.0.0, Jun. 2015 (58 pages).
Third Generation Partnership Project, Technical Specification Group Radio Access Network; Evolved Universal Terrestrial Radio Access (E-UTRA); Study on Latency Reduction Techniques for LTE (Release 14) 3GPP TR 36.881 V14.0.0, Jun. 2016 (99 pages).
Third Generation Partnership Project, "Technical Specification Group Services and System Aspects; IP Multimedia Substystem (IMS)" Stage 2 (Release 12), 3GPP TS 23.228 V12.1.0, Jun. 2013, (296 pages).
Third Generation Partnership Project, "Technical Specification Group Services and System Aspects; Feasibility Study on New Services and Markets Technology Enablers for Critical Communications" Stage 1 (Release 14), 3GPP TR 22.862 V14.1.0, Sep. 2016, (31 pages).
Third Generation Partnership Project, "Technical Specification Group Services and System Aspects; Feasibility Study on New Services and Markets Technology Enablers—Network Operation" Stage 1 (Release 14), 3GPP TR 22.864 V14.1.0, Sep. 2016 (35 pages).
Third Generation Partnership Project, "Technical Specification Group Services and System Aspects; Feasibility Study on New Services and Markets Technology Enablers—Enhanced Mobile Broadband" Stage 1 (Release 14), 3GPP TR 22.863 V14.1.0, Sep. 2016 (21 pages).
IEEE P802.11, Wireless LANs, Proposed TGax draft specification, Comment Resolutions on UL MU Operation, Sep. 13, 2016, (30 pages).
Third Generation Partnership Project, "Technical Specification Group GSM/EDGE Radio Access Network; Cellular system support for ultra-low complexity and low throughput Internet of Things (CIoT)" (Release 13), 3GPP TR 45.820 V13.1.0, Nov. 2015 (495 pages).
Third Generation Partnership Project, "Technical Specification Group Services and System Aspects; Feasibility Study on New Services and Markets Technology Enablers" Stage 1 (Release 14), 3GPP TR 22.891 V1.1.0, Nov. 2015 (95 pages).
Third Generation Partnership Project, "Technical Specification Group Services and System Aspects; Study on architecture enhancements for Cellular Internet of Things" (Release 13), 3GPP TR 23.720 V13.0.0, Mar. 2016 (94 pages).

(56) References Cited

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015 (21 pages).
Third Generation Partnership Project, "Technical Specification Group Radio Access Network; Evolved Universal Terrestrial Radio Access (E-UTRA); Medium Access Control (MAC) protocol specification" (Release 13), 3GPP TS 36.321 V13.0.0, Dec. 2015 (82 pages).
Third Generation Partnership Project, "Technical Specification Group Radio Access Network; Study on Scenarios and Requirements for Next Generation Access Technologies" (Release 14), 3GPP TR 38.913 V0.3.0, Jun. 2017 (30 pages).
Third Generation Partnership Project, "Technical Specification Group Radio Access Network; Evolved Universal Terrestrial Radio Access (E-UTRA); Radio Resource Control (RRC); Protocol specification" (Release 13), 3GPP TS 36.331 V13.0.0, Dec. 2015 (507 pages).
Third Generation Partnership Project, "Technical Specification Group Radio Access Network; Evolved Universal Terrestrial Radio Access (E-UTRA); Physical layer procedures (Release 12)," 3GPP TS 36.213 V13.0.0, Dec. 2015 (6 pages).
Third Generation Partnership Project, "Way Forward on Frame Structure", 3GPP TSG RAN WG1 #85, R1-165669, Qualcomm and etc., Nanjing, China, May 23-27, 2016, Agenda Item 7.1.4 (2 pages).
Third Generation Partnership Project, "Technical Specification Group Radio Access Network, Study on Scenarios and Requirements for Next Generation Access Technologies, (Release 14)", (3GPP), TR 38.913 V0.2.0, Feb. 2016 (19 pages).
Third Generation Partnership Project, "Technical Specification Group Radio Access Network; Evolved Universal Terrestrial Radio Access (E-UTRA); Physical Channels and Modulation (Release 13)", 3GPP TS 36.211 V13.1.0, Mar. 2016 (155 pages).
Third Generation Partnership Project, 3GPP TSG RAN WG1 #85, R1-164013, "Framework for Beamformed Access" May 2016 (4 pages).
Hattachi, R,E, , et al., "White Paper" NGMN 5G Initiative, v1.0, Feb. 17, 2015 (125 pages).
Third Generation Partnership Project, "Frame Structure for NR", 3GPP TSG-RAN WG1 #85, R1-164628, Ericsson, Nanjing, China, May 23-27, 2016 (3 pages).
Third Generation Partnership Project, "Introduction of Virtual Cell" 3GPP TSG RAN WG2 Meeting #93bis, R2-162571, Apr. 2016 (3 pages).
Third Generation Partnership Project, "Further enhancements on signaling reduction to enable light connection for LTE", 3GPP RP-160425 TSG RAN Meeting #71, Intel Corporation, Gothenburg, Sweden, Mar. 7-10, 2016 (7 pages).
Huawei, "Network slice selection" RAN WG3 Meeting #92, R3-16113, Agenda Item 10.2.3, Nanjing, China, May 23-27, 2016 (4 pages).
Third Generation Partnership Project, "Update the network slicing use case in Smarter", 3GPP S1-152395 Revision of S1-152074, ZTE Corporation et al., ZTE Smarter Update the Network Slicing Use case REV3, vol. SA WG1, No. Belgrade Serbia, Aug. 24, 2015 (3 pages).
Chu, D., "Polyphase Codes With Good Periodic Correlation Properties", IEEE Transactions On Information Theory, Jul. 1972, pp. 531-532 (2 pages).
Third Generation Partnership Project, "Technical Specification Group Services and Systems Aspects, Feasibility Study on New Services and Markets Technology Enablers for Massive Internet of Things, Stage 1" (Release 14), 3GPP TR 22.861 V14.1.0, Sep. 2016, (28 pages).
European Telecommunications Standards Institute (ETSI TS) 124 302 V13.5.0, Universal Mobile Telecommunications System (UMTS); LTE; Access to the 3GPP Evolved Packet Core (EPC) via non-3GPP access networks; Stage 3 (Release 13), 3GPP TS 24.302 V13.5.0, Apr. 2016 (128 pages).
European Telecommunications Standards Institute (ETSI TS) 136 304 V13.0.0, "LTE; Evolved Universal Terrestrial Radio Access (E-UTRA); User Equipment (UE) procedures in idle mode" (Release 13), 3GPP TS 36.304 V13.0.0, Feb. 2016 (44 pages).
Damour, N., List of Common Services Functions—Call for Contributions, M2M Functional Architecture Technical Specification, Doc# oneM2M-ARC-2013-0304R04—List of oneM2M CSFs—Call for contributions—2.DOC Input Contribution, Jul. 11, 2013, 1-5 pages.
Third Generation Partnership Project, (3GPP) TSG RAN WG1 #85, R1-164014, Discussion on RS for Beamformed Access, Samsung, Nanjing, China, May 23-27, 2016 (3 pages).
Third Generation Partnership Project, (3GPP) S2-161324 SA WG2 Meeting #113, Solution to Key Issue on Mobility Framework, Sophia Antipolis, FR, Feb. 23-26, 2016 (3 pages).
European Telecommunications Standards Institute (ETSI TS) Digital cellular telecommunications system (Phase 2+) (GSM); Universal Mobile Telecommunications System (UMTS); General Packet Radio Service (GPRS); Service Description; Stage 2 (3GPP TS 23.060 version 13.6.0 (Release 13) Apr. 2016 (364 pages).
European Telecommunications Standards Institute (ETSI TS) LTE; General Packet Radio Service (GPRS) enhancements for Evolved Universal Terrestrial Radio Access Network (E-UTRAN) access (Release 13), 3GPP TS 23.401 V13.6.1, May 2016 (367 pages).
European Telecommunications Standards Institute (ETSI TS) Technical Specification LTE; Evolved Universal Terrestrial Radio Access (E-UTRA); Requirements for support of radio resource management (Release 14), 3GPP TS 36.133 V14.7.0, Apr. 2018 (2999 pages).
OMA Open Mobile Alliance, "Lightwieght Machine to Machine Technical Specification, Approved Version 1.0", OMA-TS-LightweightM2M-V1_0-20170208-A, Feb. 8, 2017 (138 pages).
A-Yong et al., "Research on Tower Crane Automatic Tracking and Zooming Video Monitoring System based on Improved Camshift algorithm", 2011 International Conference on Electric Information and Control Engineering, Wuhan, 2011, 4 pages.
Third Generation Partnership Project, "Technical Specification Group Radio Access Network Evolved Universal Terrestrial Radio Access (E-UTRA)"; Multiplexing and channel coding (Release 13), 3GPP TS 36.212 V13.2.0 (Jun. 2016), 140 pages.
European Telecommunications Standards Institute, Machine-to-Machine communications (M2M); Functional architecture, ETSI TS 102 690 V1.1.1 (Oct. 2011), 280 pages.

* cited by examiner

SYSTEMS AND METHODS FOR SELECTIVE OBJECT-OF-INTEREST ZOOMING IN STREAMING VIDEO

CROSS-REFERENCE TO RELATED APPLICATION

The present application is a national stage application under 35 U.S.C. 371 of International Application No. PCT/US2018/018540, entitled SYSTEMS AND METHODS FOR SELECTIVE OBJECT-OF-INTEREST ZOOMING IN STREAMING VIDEO, filed on PCT Feb. 17, 2018, which claims benefit under 35 U.S.C. § 119(e) from U.S. Provisional Patent Application Ser. No. 62/460,651, entitled "SYSTEMS AND METHODS FOR SELECTIVE OBJECT-OF-INTEREST ZOOMING IN STREAMING VIDEO," filed Feb. 17, 2017, the entirety of which is incorporated herein by reference.

BACKGROUND

With current technology, users are able to view streaming video content in various different locations and on numerous different client devices, from television sets to laptop computers, tablet computers, smartphones, and other devices. Users have great flexibility in where and when they will view content. However, those users are not necessarily provided a significant amount of flexibility in the views that are displayed to them; those views are generally determined by a director or other content creator. To some extent, user control over the presented views is limited by bandwidth. Streaming multiple views of a video to a user and allowing the user to select which view to display would consume an excessive amount of bandwidth. Alternatively, if a user were to request different streams for display at different times, bandwidth consumption would be more limited, but the user may experience an unsatisfactory level of latency between the time when a new stream is requested by the user and the time when the new stream has been retrieved from a distant server and is displayed on the client device. It would be desirable to provide users with more flexible options for obtaining different views in a video and for providing a high level of quality for that video while making efficient use of limited available bandwidth.

SUMMARY

Exemplary systems and methods are described to enable viewers of video presentations to select from among a plurality of available objects of interest in order to view, with minimal latency, zoomed versions of the selected object or objects of interest. In some embodiments, different zoom factors may be selected for the zoomed content in response to user input.

In exemplary embodiments, zoomable areas within a video are signaled by a video encoder or other content server to a client device. The client device enables the end customer to choose a zoom region and with little latency (e.g. within a single frame time) switches over to either a video stream based on local processed video in baseband or based on an incoming alternative video stream representative of the chosen zoomed stream.

In some embodiments, a client device is receiving streaming video along with metadata that identifies locations (e.g. bounding boxes) of objects of interest within the streaming video. The metadata may include information identifying one or more alternative streams associated with each object of interest. An alternative stream associated with an object of interest may be, for example, a video of a zoomed version of the respective object of interest.

In an exemplary embodiment, the client device receives from the user a selection of an object of interest to zoom into. In response, the client may retrieve the associated stream identified in the metadata (e.g. by issuing an HTTP request or by other means). The client decodes the alternative stream or streams representing the zoomed object of interest and causes display of the content to the user, e.g. by directly displaying the content on a screen of the client or by sending video data (e.g. uncompressed video) to an external display device.

In some embodiments, the display of the selected zoomed content may be rendered forward in time after the user selection at the zoomed resolution in a full screen display mode, such that the selected object of interest continues to be displayed in a zoomed format until, e.g, a user instructs otherwise or video of the object of interest is no longer available. In some embodiments, the selected object of interest remains substantially centered on the screen even if the object changes position with respect to the un-zoomed video.

In some embodiments, the zoomed content is displayed simultaneously with the original un-zoomed content. For example, the zoomed content may be displayed in a picture-in-picture relationship with the un-zoomed content (with either the zoomed or the un-zoomed content being displayed in the picture-in-picture inset), in a side-by-side presentation, in an alpha-blended combination, or otherwise displayed simultaneously to the viewer.

In exemplary embodiments, the zoomed content is retrieved as a separate stream, different from the stream encoding the un-zoomed content. In some embodiments, a manifest file, such as an MPEG DASH media presentation description (MPD) file is provided to the client. The manifest file may include information identifying one or more available video segments that encode the un-zoomed content and one or more available video segments that encode zoomed video of an associated object of interest. Available zoomed and un-zoomed streams may be identified using a URL or a template from which a URL may be generated. A manifest may further include data (e.g. in XML format) identifying an object of interest with which a stream is associated, or data indicating that the stream is an un-zoomed stream. Various different streams may be identified in a manifest file, including streams encoded at different bitrates to enable adaptive bitrate streaming.

In one exemplary method performed by a client device, the device receives an original video stream over a network and causes display of the original video. The client also receives, over the network, information identifying at least one object of interest and a spatial position of the object of interest within the original video stream. The device detects a user input selecting the object of interest and, in response, generates a first zoomed video of the object of interest from the received video stream and causes display of the first zoomed video.

In another exemplary method, a client receives a primary video stream. The client also receives tracking information for a plurality of tracked objects in the primary video stream, the tracking information indicating a time-varying position of each of the tracked objects (e.g. coordinates of the objects themselves or of bounding boxes corresponding to the objects). The client displays the primary video stream. While the primary stream is being displayed, the client receives a user input (e.g. on a touch screen) selecting (i) a spatial location in the primary video stream and (ii) a zoom factor. Based on the selected spatial location, the client identifies which tracked object is being selected. Based on the time-varying position and the selected zoom factor, the client crops and upscales the primary video stream to generate a first cropped and upscaled video stream that follows the selected tracked object at the selected zoom factor, and the client displays the first cropped and upscaled video stream.

In some such embodiments, while the first cropped and upscaled video stream is displayed, the client receives a subsequent user input to change the zoom factor to a subsequent zoom factor. In response to the subsequent user input, the client uses the time-varying position and the subsequent zoom factor to crop and upscale the primary video stream to generate a second cropped and upscaled video stream that follows the selected tracked object at the subsequent zoom factor. The client then switches to display of the second cropped and upscaled video stream.

In some embodiments, the cropping is performed so as to keep the tracked selected tracked object substantially centered in the cropped and upscaled video stream even as the selected tracked object moves with respect to the primary video stream.

In some embodiments, the client receives user input selecting two or more spatial locations in the primary video stream and identifies a tracked object for each spatial location. In such an embodiment, the cropping and upscaling is performed based on the time-varying position of the two or more selected objects to generate a cropped and upscaled video stream that follows the two or more selected objects at the selected zoom factor.

In some embodiments, the primary video stream includes a plurality of segments, and metadata regarding tracked objects in each segment is provided on a segment-by-segment basis. Where the tracked objects are players in a sporting event, the metadata may provide, for example, names and/or biographical information regarding the players.

Further described herein are various user features that may be used to enable user selection and/or control of video display options. In some embodiments, such options may include scaling, alpha blending, zooming and/or cropping in order to display the zoomed content according to the users commands and/or preferences.

Exemplary embodiments further include client devices comprising a network interface, a processor, and a non-transitory storage medium storing instructions operative when executed on the processor to perform methods described herein. Such a client device may include a touch screen for display and user input.

DETAILED DESCRIPTION

Various techniques described herein enable the use of high resolution, high frame-rate and/or high bit depth capture of content to be repurposed to provide useful features to end consumers of video. In some embodiments, those features may include generating additional or alternate views for the end user, such as zoomed views of particular objects or regions of interest.

Exemplary User Interface Display.

Figure 1:
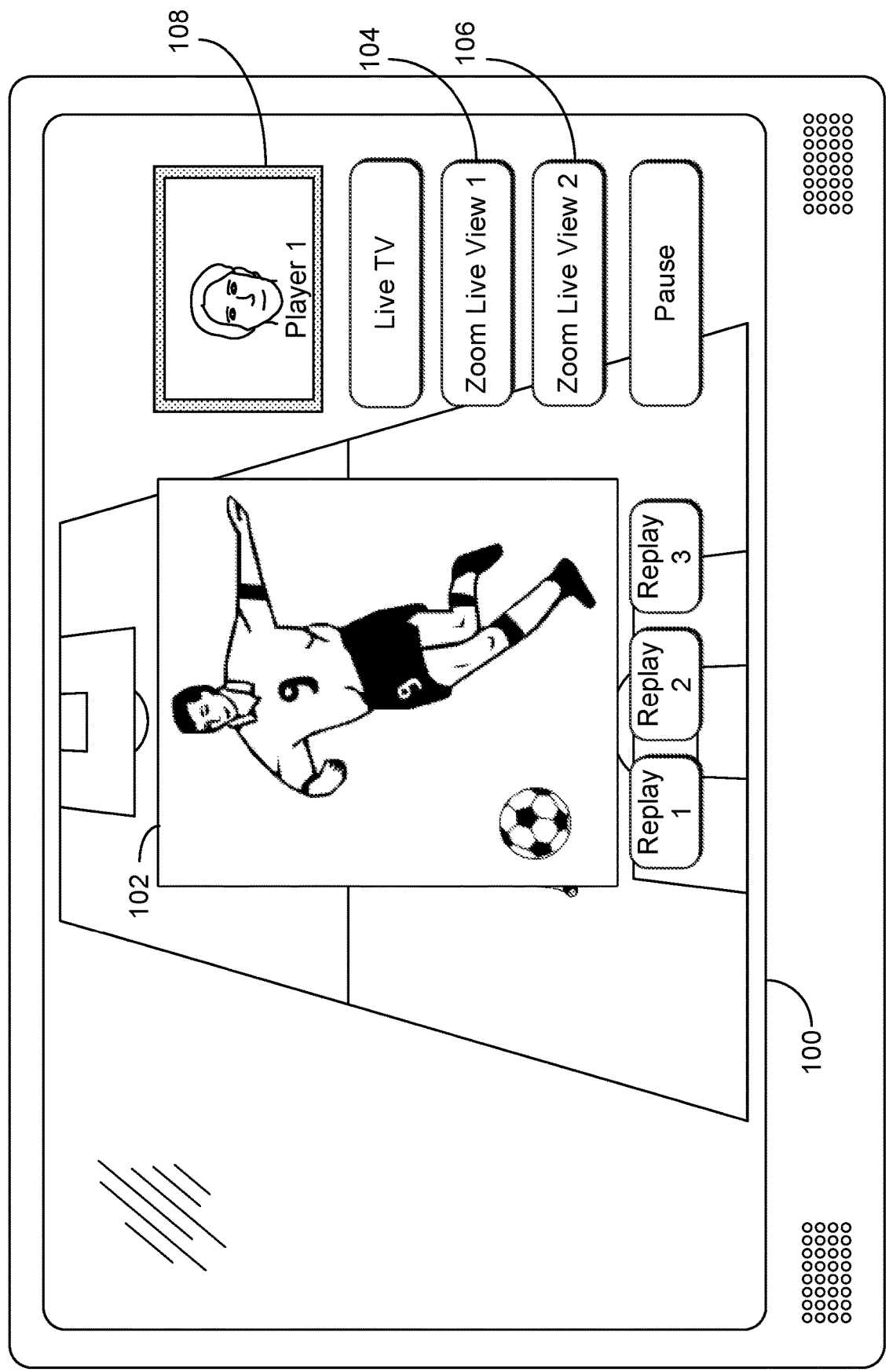
FIG. 1 illustrates an exemplary user interface displayed on a client display device.

FIG. 1 illustrates an exemplary user interface display 100 for a video system. Un-zoomed content (in this example, streaming video of a soccer game) is displayed in a first window 102, and zoomed view options are displayed (e.g. as selectable buttons 104, 106) to the right. Those zoomed views may be dynamically enabled and disabled (e.g. in the user interface) depending on the additional zoomed streams that are available. Techniques that are used in some embodiments to make zoomed streams available and to deliver metadata that describes such availability to a client application include techniques described in U.S. Provisional Patent Application No. 62/383,371, filed Sep. 2, 2016, entitled "Systems and Methods for Fast Channel Change," the entirety of which is incorporated herein by reference. In an exemplary embodiment, the client application uses the metadata information to enable and disable user interface elements (such as buttons 104, 106) which the user may select in order to invoke zooming features. For example, the availability of alternative streams with zoomed content for a particular sports player (e.g. "Player 1") may prompt the client to display a button or other invokable user interface element, such as the "Player 1" button 108.

In some embodiments, the user interface is operative to enable a user to map zoom buttons to selected objects of interest (e.g., the user's favorite athletes). In some embodiments, information is provided to a video player that tracks the objects of interest (e.g. favorite athletes) and identify which athlete is on screen at a given time. Such information may be generated using various techniques. For example, RFID tags may be used to track individual athlete locations at the sporting venue, and such location information may be compared to tracked camera location and orientation information to determine whether or not an athlete is visible in a particular camera at different points in time. The information tracking the location of objects of interest may be accompanied by identification information (IDs) identifying the object of interest (e.g. identifying a particular athlete). In response to receipt of information indicating that an object of interest is currently on-screen, a user interface button or other user interface element corresponding to the user may be activated (e.g. the button may appear on the screen, or the button may change from an inactive state to an enabled state). The button or other user interface element may disappear or may otherwise be disabled in response to receipt of information indicating that the object of interest is no longer visible on the screen.

In some embodiments, there may be many objects or athletes with available zoomed content streams. In some such embodiments, user preferences or past user viewing history may be used to limit the zoom controls to the athletes or objects that are favorites of the user or are otherwise selected explicitly or implicitly by the user. Objects of interest may be selected, for example, in response to a determination that the user has explicitly indicated a preference to follow those objects, or in response to a determination that the user has followed or zoomed into in those objects of interest in past sessions.

In some embodiments, in response to selection by a user of an active zoom button, the next frame of video displayed after the selection is a frame of zoomed video that corresponds to the zoom-selected object.

Exemplary Pinch and Zoom Functionality.

Although in some embodiments, zooming in on a particular athlete or other object of interest is accomplished through activation of a button displayed on the screen, other embodiments use different techniques to detect a user request for zooming functionality. A technique that is employed in some embodiments is a pinch-and-zoom user input. One such embodiment is illustrated with respect to FIGS. 2A-2D.

Figure 2A:
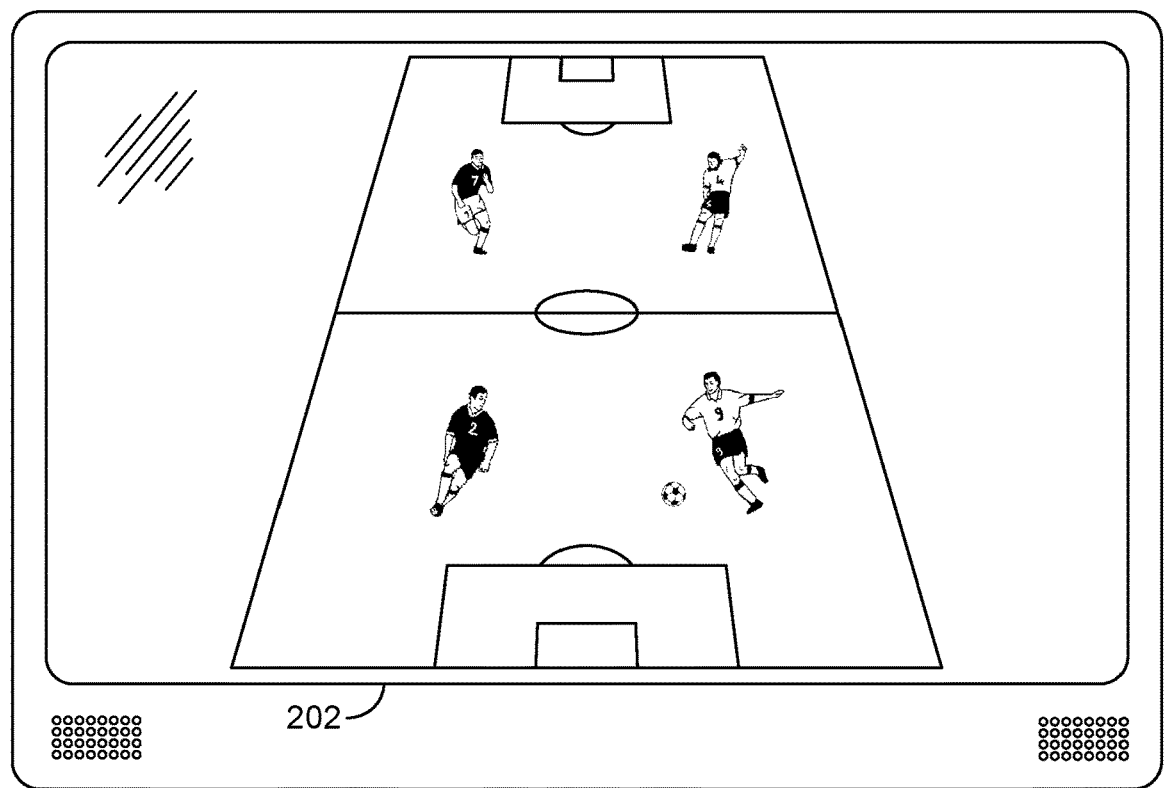
FIGS. 2A-2D illustrate the appearance of a video and user interface elements on a client display device during performance of a method according to one embodiment.

A client display device 200 presenting a streaming video of a soccer game is illustrated in FIG. 2A. In the display of FIG. 2A, four athletes are visible on the screen 202. The client device may receive metadata indicating the availability of zoomed streams corresponding to one or more objects of interest, such as one or more of the visible athletes. The metadata may identify, for each object of interest, multiple zoomed streams having different zoom factors, such as one stream having a 2× zoom of a particular athlete and another stream having a 4× zoom of the same athlete.

Figure 2B:
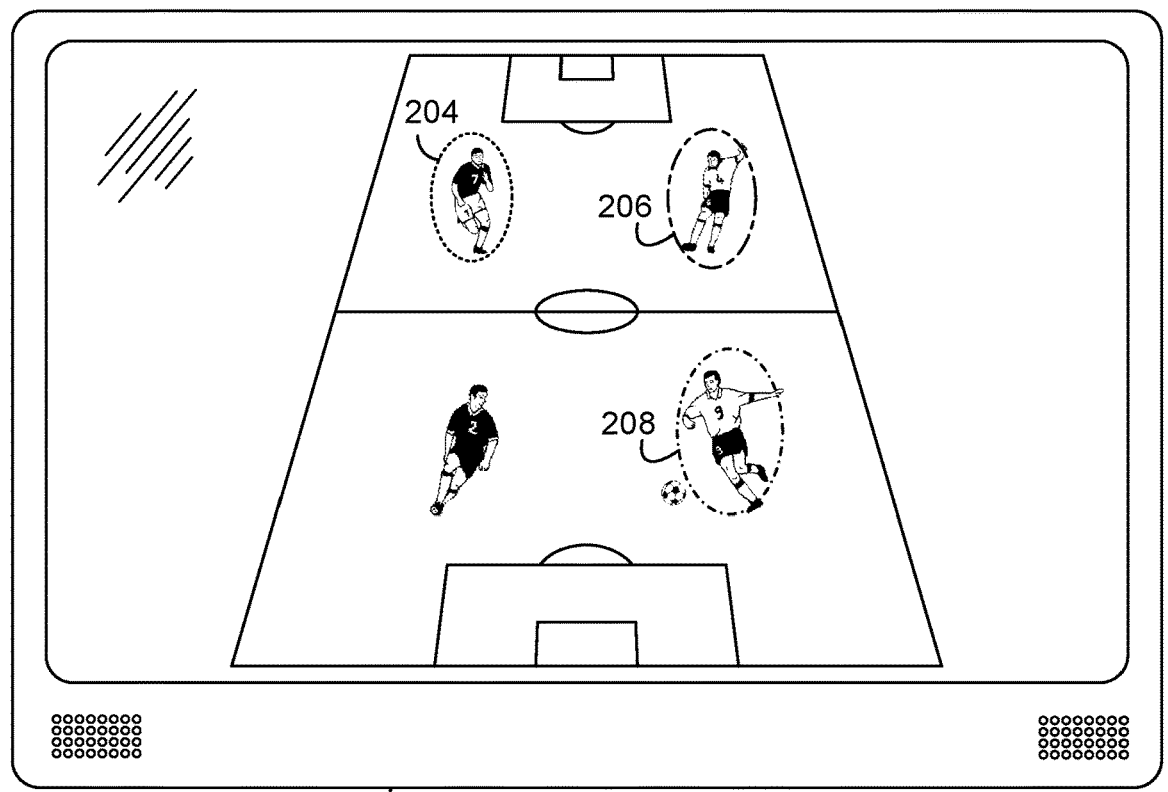

As illustrated in FIG. 2B, the client device 200 has received information that identifies three objects of interest, identifies at least one zoomed stream for each of the objects of interest, and indicates the spatial locations of those objects of interest within the video. In response to the information, the client device displays indications 204, 206, 208 of the objects for which zoomed streams are available. In the embodiment of FIG. 2B, each of the athletes for which a zoomed stream is available is identified by an encircling ellipse displayed on the screen of the display device. While the encircling ellipse has been chosen as an example for ease of illustration, it should be noted that other techniques for providing on-screen indications of the objects of interest may alternatively be used. For example, a particular tone mapping may be applied to each region that includes an object of interest, or regions including an object of interest may be outlined, brightened, recolored, haloed, or otherwise highlighted. In some embodiments, the highlighting may be the same for each object of interest. In other embodiments, the highlighting may be different for each object of interest. For example, different objects of interest may be outlined with different colors. In the embodiment illustrated in FIG. 2B, different objects of interest are outlined using different line types.

The information identifying the objects of interest and providing accompanying information may be periodically sent as an alternative very low bit rate stream from the server, e.g. as a sequence of JPEGs. Alternatively, the coordinates of the objects of interest or of regions enclosing respective objects of interest may be communicated in-stream in the private data section of the video. Other techniques may alternatively be used to communicate the location of objects of interest. The player then renders the highlights in response to an interactive mode being enabled by the user. The user may then be provided with a "pinch and zoom" or other input capability on a touch screen or other input device that will play the zoom stream corresponding to that player.

For example, in some embodiments, a client device is equipped with a touch-screen display. The client device continually monitors for touch input by a user. Display of a zoomed stream associated with an object of interest may be triggered in various ways. For example, the client device may detect that (i) a user has touched the screen substantially simultaneously at two different touch points, (ii) an object of interest (or at least a portion of such an object) is located between the two touch points, and (iii) the distance between the touch points is increasing. In response to detection of an appropriate touch input, the client device may begin display of the zoomed stream corresponding to the requested object of interest. As described in further detail below, the level of zoom (or zoom factor) of the zoomed stream may be a predetermined default level of zoom, or the level of zoom may be determined at least in part on the touch screen user input. For example, the level of zoom may be proportional to the change in distance between the touch points, such that the user can achieve a low level of zoom by moving his fingers slightly apart on the screen and can achieve a greater level of zoom by moving his fingers farther apart on the screen.

Figure 2C:
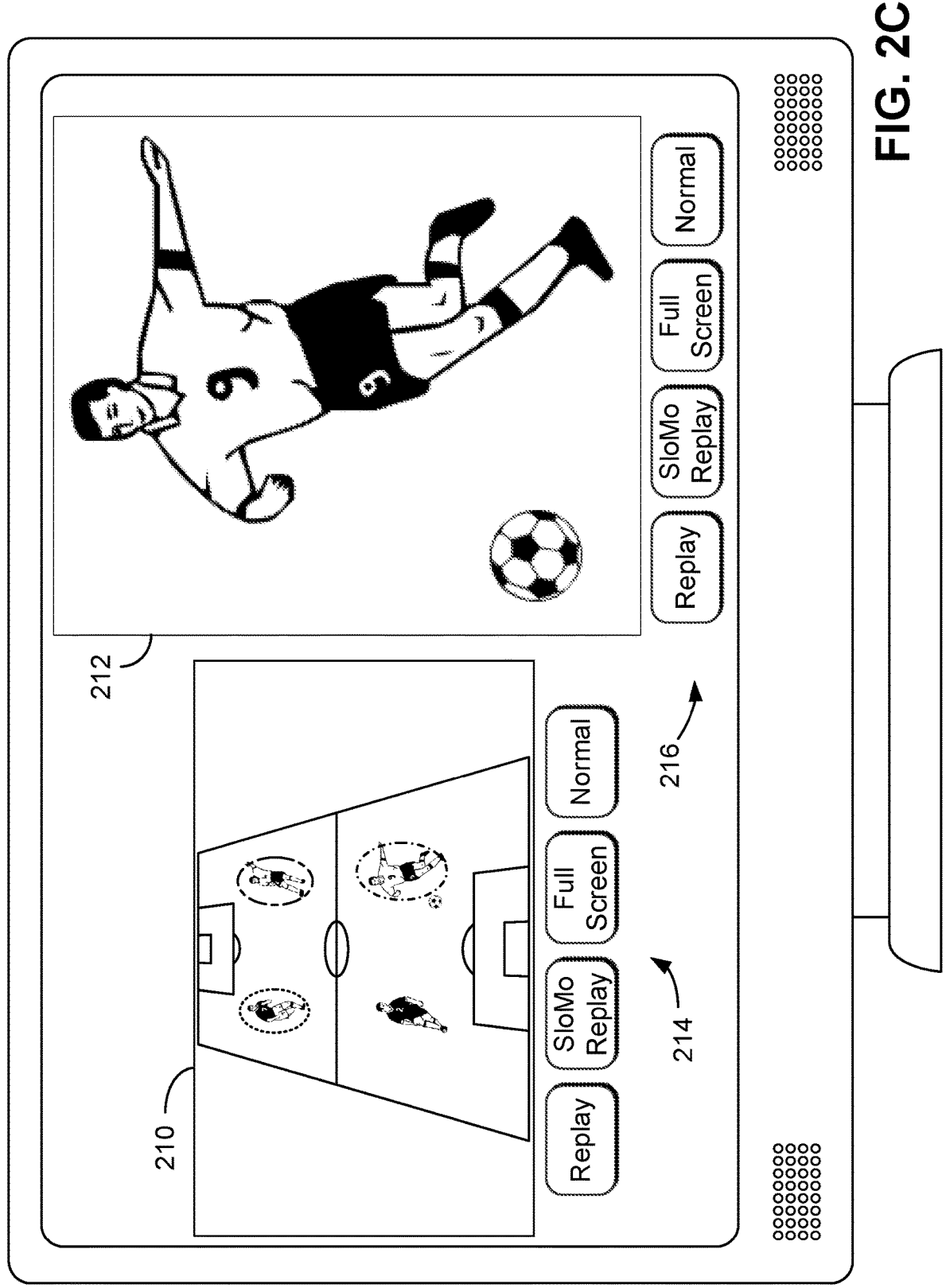

In response to user selection of a zoomed stream corresponding to one of the objects of interest, the client device display may appear as illustrated in FIG. 2C, with the original un-zoomed video stream 210 continuing to be displayed on the left side of the screen and the zoomed stream 212 corresponding to the selected object of interest (an athlete) being displayed on the right side of the screen. The arrangement of different streams on the display screen may be different in different embodiments. In some embodiments, the un-zoomed stream may no longer be displayed after selection of a zoomed stream. In some embodiments, the display of the selected zoomed video stream continues forward from the time that stream was selected by the user at least until a user provided input indicating a desire to return to display only of the un-zoomed stream, or until the zoomed stream is no longer available (e.g. when the athlete is substituted out of the match). In exemplary embodiments, the zoomed stream continues to follow the selected object of interest even if that object moves around with respect to the un-zoomed stream (e.g. as the athlete moves around the playing field).

As illustrated in FIG. 2C, separate interaction buttons may be provided for the un-zoomed stream (buttons 214) and the zoomed stream (buttons 216).

Figure 2D:
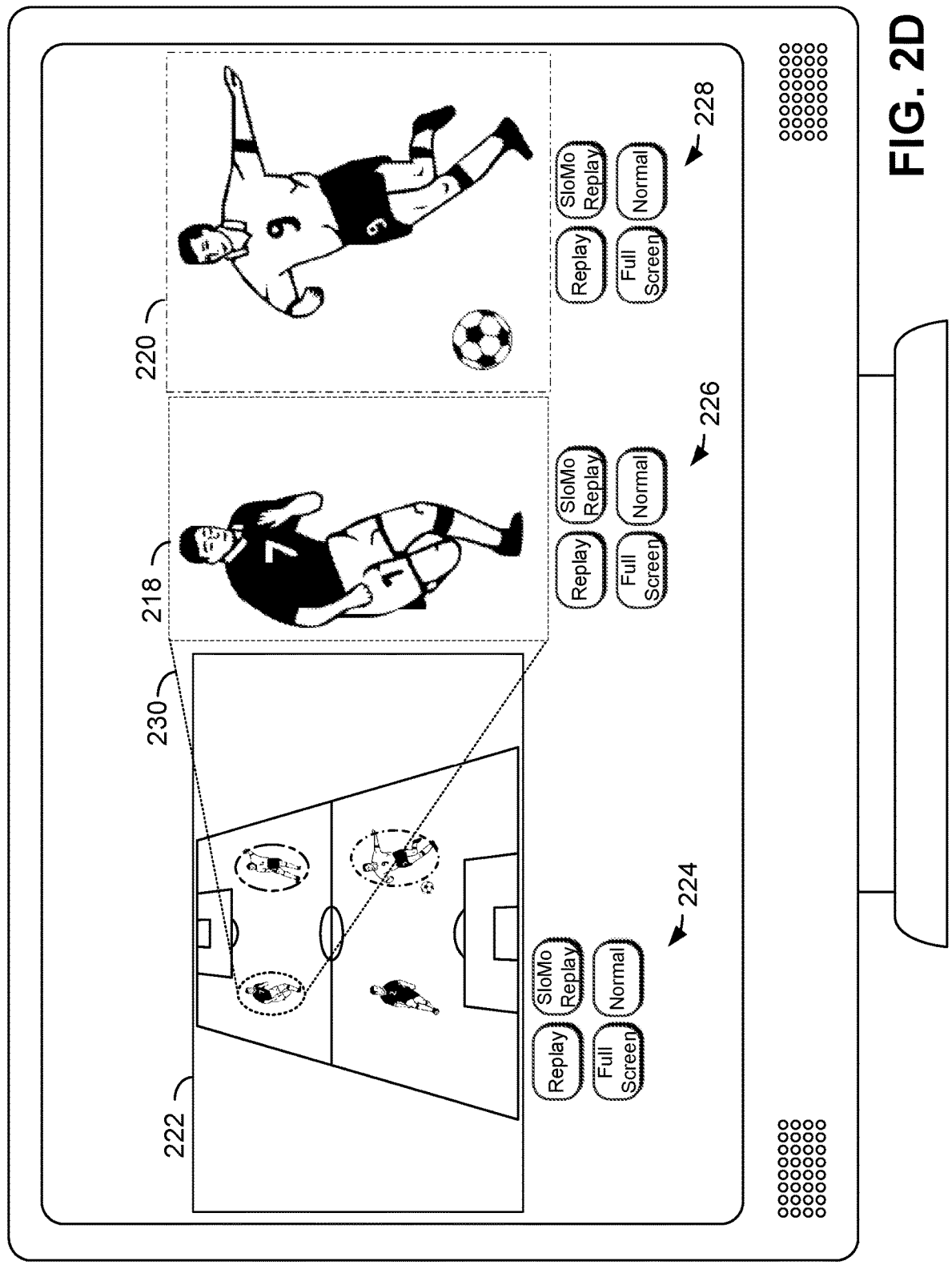

As illustrated in FIG. 2D, in some embodiments, a user may select more than one zoomed stream for simultaneous display. In the example of FIG. 2D, a user has selected zoomed streams 218, 220 corresponding to two athletes. A border or other indication may be used to indicate which zoomed stream corresponds to which object of interest in the un-zoomed stream. For example, the object of interest in the un-zoomed display may be outlined in a particular color, and the zoomed stream corresponding to that object of interest may be outlined in that same color. For purposes of illustration in FIG. 2D, each zoomed stream 218, 220 is outlined using the same type of dashed line used to outline the corresponding object of interest in the un-zoomed stream 222. As is further illustrated in FIG. 2D, each stream may be provided with a separate set of user interaction buttons 224, 226, 228 for control of playback of the respective stream. In some embodiments, a line or lines may be displayed to visually connect an object of interest in the un-zoomed stream with the corresponding zoomed stream. An example of such a connector is illustrated as connector 230 for the athlete wearing number 7.

Figure 3:
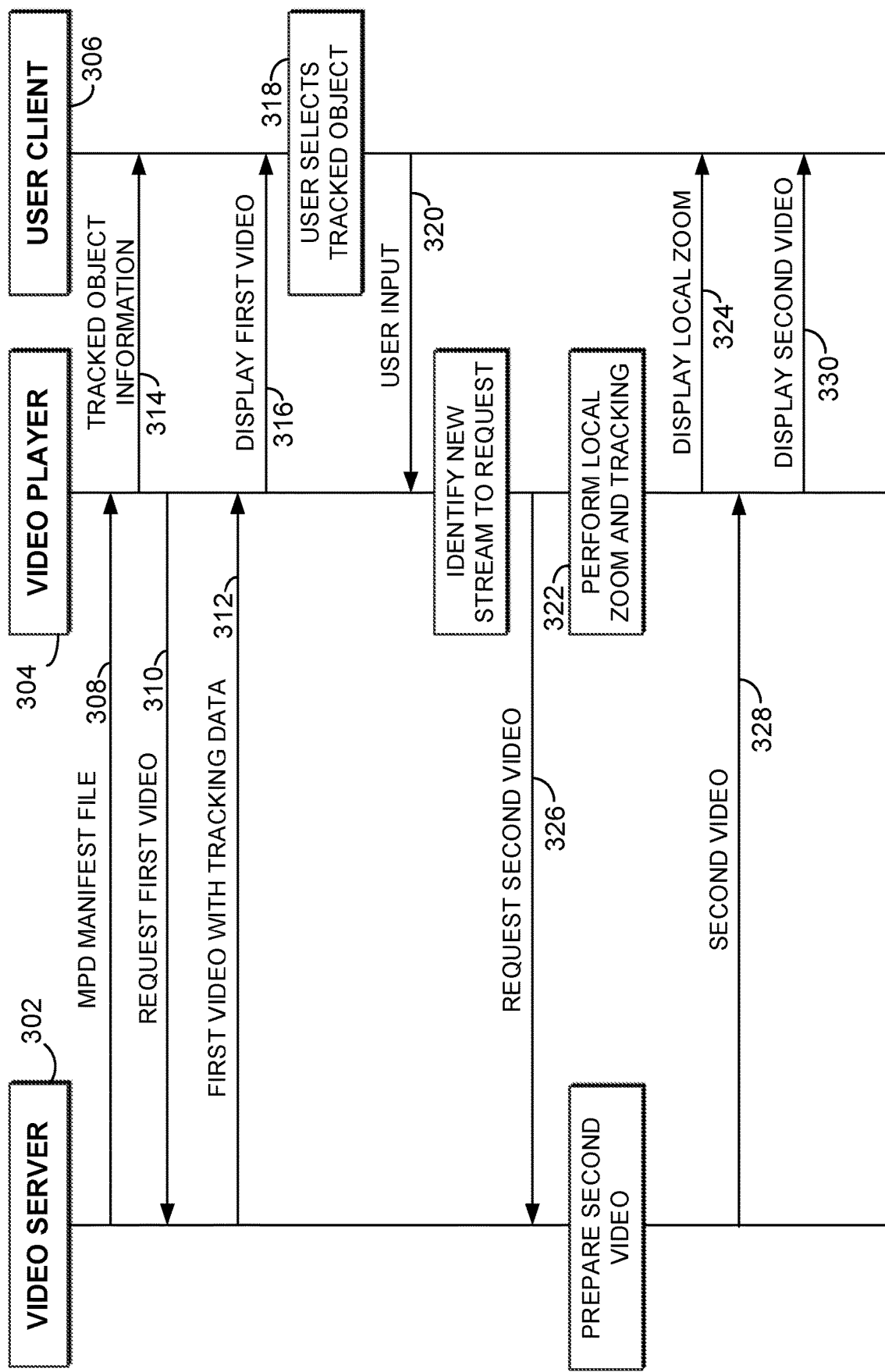
FIG. 3 is a message flow diagram illustrating an exchange of data in an exemplary embodiment.

FIG. 3 is a message flow diagram illustrating an exemplary interaction among a video server 302 (which hosts the main video and supports zooms), a video decoder client device 304, and a user 306 of the client device. In step 308, the video server provides an MPD or other manifest file to the client which describes the main video and possible zooms. The video player 304 requests a first video (e.g. an un-zoomed video) in step 310, and the server provides the stream in step 312.

The manifest file provided in step 308 includes information identifying one or more tracked objects in the video. Information identifying the tracked objects may be displayed to the user in step 314. As the first video is displayed to the user client in step 316, the user in step 318 provides an input to select a tracked object, for example using a pinch and zoom operation. In response to receiving the pinch and zoom input (step 320), the video player crops and upscales the original un-zoomed stream in step 322 to produce a locally-generated version of the zoomed stream (e.g. cropping areas outside the region of interest and upscaling the cropped un-zoomed video by an appropriate zoom factor). The locally-generated zoomed video may not have a video quality as high as the video quality of the dedicated zoomed stream due to the upscaling. However, because the locally-generated zoomed video is generated from a video stream that is already being received by the client device, the locally-generated zoomed video may be displayed (step 324) with little or no perceptible delay following the selection by the user. For example, in some embodiments, the next displayed frame of video following user selection may be a frame of the locally-generated zoomed video.

In parallel with the generation of the locally-generated zoomed video, the video player in step 326 requests from the server the zoomed stream that corresponds to the selected object of interest. The zoomed stream may have a higher resolution (or a higher quality in other respects) than the corresponding locally-generated zoomed video. However, there is likely to be some latency in retrieval (step 328) of the zoomed stream from the server. In an exemplary embodiment, the client device continues playing the locally-generated zoomed video until the device determines that a sufficient amount of the zoomed stream has been retrieved to permit display of the zoomed stream. The client device then switches to display of the zoomed stream in step 330.

In some exemplary embodiments, the rendering of the content may be performed with the zoomed stream being played as full-screen content. In other embodiments, the zoomed content may be rendered as an insert (e.g. picture-in-picture) in the un-zoomed content. In some embodiments, users are provided with the ability to select among different display options (e.g. full-screen display versus picture-in-picture display or side-by-side display). The zoomed content may be cropped differently for different display configurations.

Figure 4:
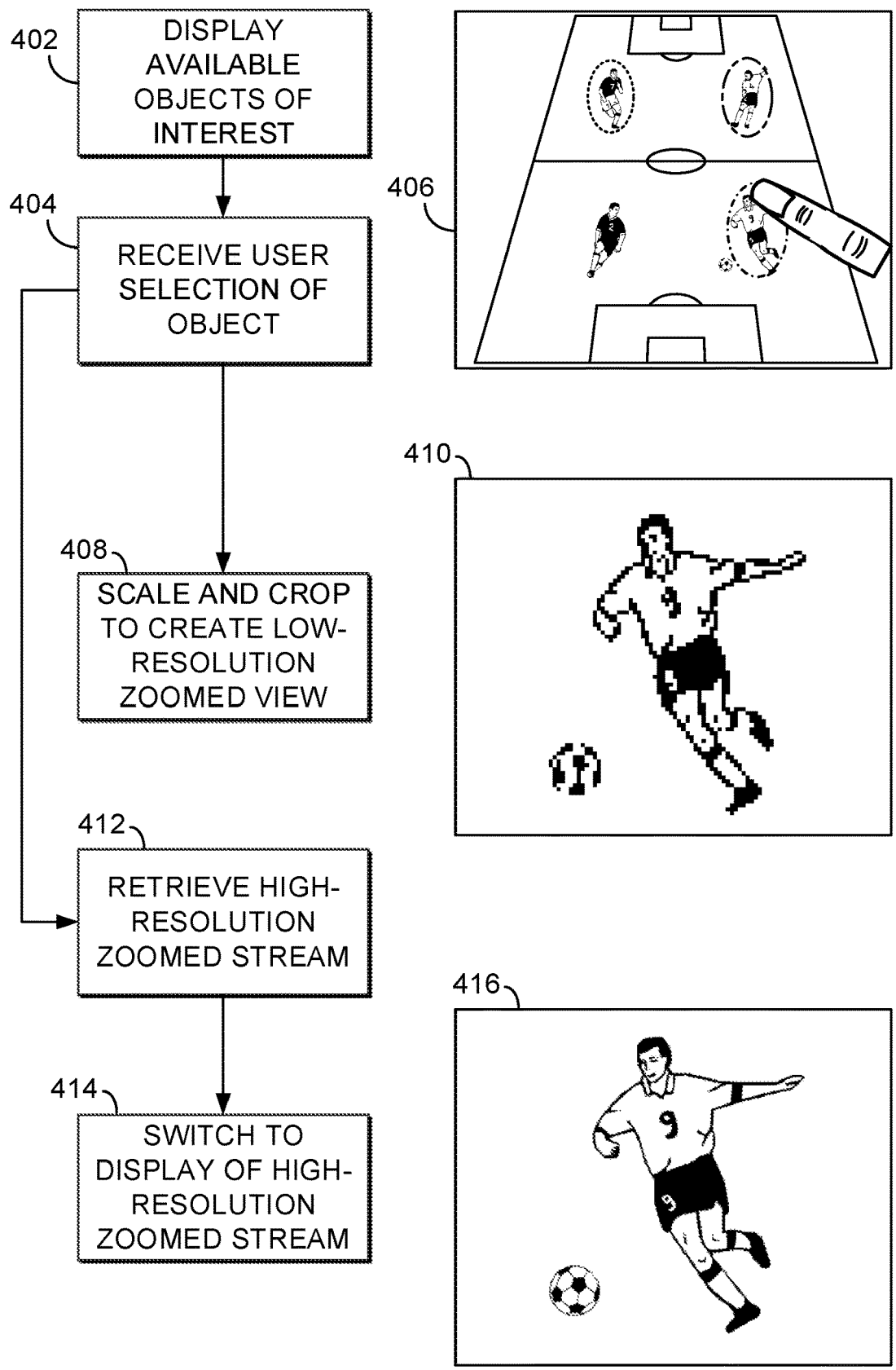
FIG. 4 is a flow chart illustrating an exemplary method.

A method performed by a client device is illustrated in the flow chart of FIG. 4. In the method of FIG. 4, the client device in step 402 displays available objects of interest in an un-zoomed video. The device receives in step 404 a user selection of an object of interest (e.g. through a touch-screen interface). An illustration of steps 402 and 404 being performed on a client device with a touch screen is provided in box 406.

In response to the selection, the device scales and crops the un-zoomed video in step 408 to generate a low-resolution zoomed view. An example of a low-resolution zoomed view is illustrated in box 410. The low-resolution zoomed view may be displayed with little to no perceptible latency. For example, the low-resolution zoomed view may be displayed in the next frame after selection by the user is received. In parallel, the client device in step 412 retrieves a high-resolution zoomed stream (e.g. from a content server over a network). When a sufficient amount of the high-resolution zoomed stream has been received, the client device performs a synchronized switchover in step 414 to display of the high-resolution zoomed stream. An example of a high-resolution zoomed view is illustrated in box 416.
Anticipatory Streaming of Zoomed Streams.

In some exemplary embodiments described above, separate zoomed streams are not requested until a user request for a zoomed stream is detected. In some embodiments, however, the client device may receive and decode low-bitrate versions of zoomed streams to be used in the event that the user selects an object of interest for zooming.

Figure 5:
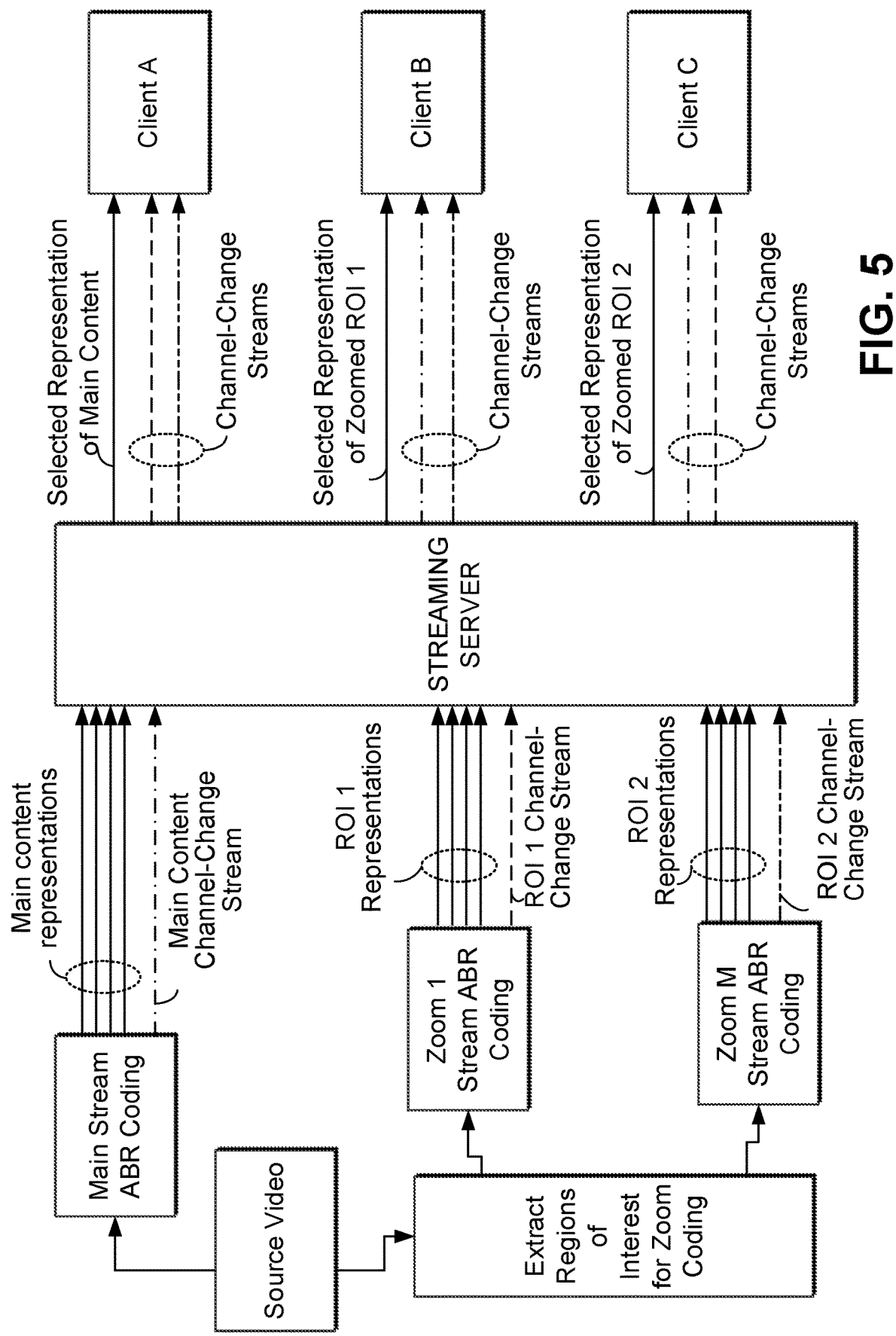
FIG. 5 is a schematic block diagram illustrating use of channel-change streams according to some embodiments.

FIG. 5 is a schematic block diagram of the architecture of an exemplary system for rapid selection of a zoomed stream in which clients are provided with the ability to switch among different zoomed streams related to an un-zoomed main stream. The embodiment of FIG. 5 is implemented in an adaptive bitrate video distribution architecture (e.g. using DASH). In the illustrated embodiment, the zoom coded streams are zoomed-in views of particular regions of interest (ROIs) (e.g. regions surrounding an object of interest). In the example of FIG. 5, low-bitrate versions of zoomed streams are referred to as channel-change streams. Client A is receiving and displaying a selected representation of the main, un-zoomed content. Client A may have selected a particular representation of the un-zoomed content from among several available representations that may differ from one another in, for example, bitrate. For example, Client A may have selected the highest available bitrate compatible with reliable delivery over current network conditions.

While client A is receiving, decoding, and displaying the main content, Client A may also be receiving and decoding relatively lower-bitrate channel-change streams, with each of the channel-change streams corresponding to a particular region of interest. In response to user selection of the region of interest, Client A may switch to display of the channel-change stream that corresponds to the selected region of interest. Because the channel-change stream was already being decoded, display of the zoomed content may begin with little or no perceptible delay, e.g. in the next frame after user selection. Using adaptive bitrate streaming techniques, Client A may subsequently retrieve the requested zoomed content at a higher bitrate as network conditions permit. A channel-change stream may also be available for the un-zoomed content. For example, Client B is receiving, decoding, and displaying a zoomed stream for region of interest ROI 1. Concurrently, Client B is receiving and decoding but not displaying a low-bitrate channel-change stream for the main content, allowing the user to switch back to display of the un-zoomed content with low latency.

Some embodiments are implemented using MPEG DASH. A simplified example of an MPD (a "pseudo MPD") that may be used in some embodiments is described below. The exemplary MPD identifies different content representations for zoomed streams within a single DASH period and adaptation set. Other locations and methods for sharing this data, such as other types of manifest file, may alternatively be used.

A pseudo MPD describing a primary stream, a zoom stream and a fast channel change stream is described below.

'cc1', a representation with short segment size of 1 second and lower resolution and bitrate is used. The relevant representations may be identified as follows in a DASH MPD.

```
<Representation id="primary" bandwidth="6800000"
    width="1920" height="1080"> <S t="0" r="30" d="10000 "/>
<Representation id="zoom1" bandwidth="6800000"
    width="1920" height="1080"> <S t="0" r="30" d="10000 "/>
<Representation id="cc1" bandwidth="500000"
    width="360" height="240"> <S t="0" r="300" d="1000 "/>
```

In the context of a DASH MPD, the above-listed elements may appear as follows.

```
<Period duration="PT5M">
<BaseURL>main/</BaseURL>
<!-- main video source -->
<AdaptationSet mimeType="video/mp2t">
<BaseURL>video/</BaseURL>
<!- Main 1080p Representation at 6.8 Mbps and 10 second segments -->
<Representation id="primary" bandwidth="6800000" width="1920" height="1080">
        <BaseURL>primary/</BaseURL>
        <!-- SegmentTemplate to derive related segments names -->
        <SegmentTemplate media="media-$Number$.ts" timescale="1000">
        <SegmentTimeline>
        <!-- 30 segments duration of (10 = 10000 / @timescale) sec -->
        <S t="0" r="30" d="10000 "/>
        </SegmentTimeline>
        </SegmentTemplate>
</Representation>
<!-Zoom1 1080p Representation at 6.8 Mbps and 10 second segments -->
<Representation id="zoom1" bandwidth="6800000" width="1920" height="1080">
        <BaseURL>Zoom1/</BaseURL>
        <!-- SegmentTemplate to derive related segments names -->
        <SegmentTemplate media="segment-$Number$.ts" timescale="1000">
        <SegmentTimeline>
        <!-- 30 segments duration of (10 = 10000 / @timescale) sec -->
        <S t="0" r="30" d="10000"/>
        </SegmentTimeline>
        </SegmentTemplate>
</Representation>
<!- Channel Change Representation at 0.5 Mbps and 1 second segments -->
<Representation id="cc1" bandwidth="500000" width="360" height="240">
        <BaseURL>cc1/</BaseURL>
        <!-- SegmentTemplate to derive related segments names -->
        <SegmentTemplate media="media-$Number$.ts" timescale="1000">
        <SegmentTimeline>
        <!-- 300 segments duration of (1 = 1000 / @timescale) sec -->
        <S t="0" r="300" d="1000"/>
        </SegmentTimeline>
        </SegmentTemplate>
</Representation>
</AdaptationSet>
```

50

Descriptions of the streams referenced in the MPD are further provided below. Note that the exemplary channel-change stream has short segment length as well as low resolution and bitrate. The deriving of segment numbers for the individual duration and segment length may be performed through Segment Templates illustrated below. Parameters to segment template allow specification of short segments for the channel-change stream 'cc1'.

Figure 6A:
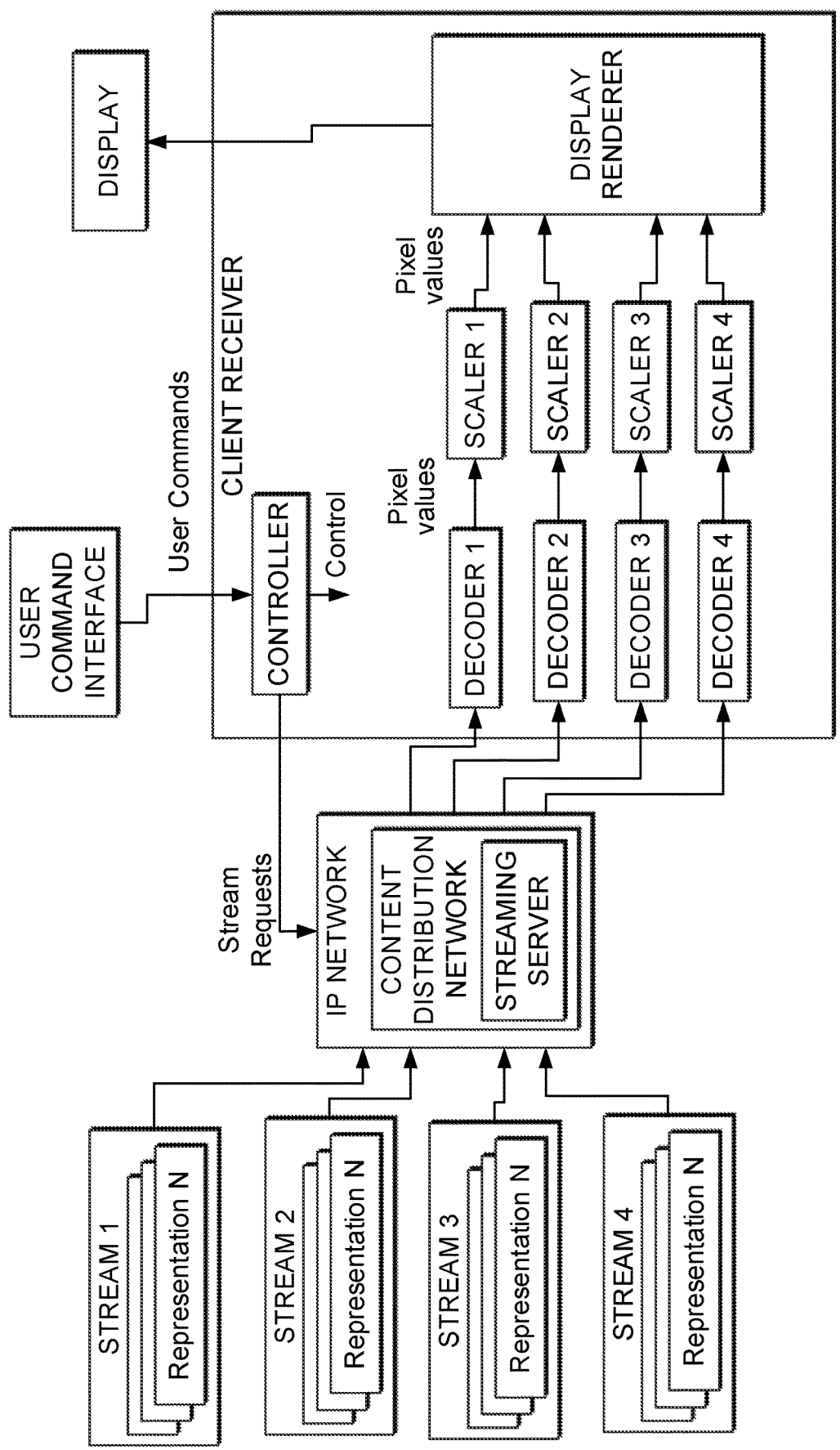
FIG. 6A is a functional block diagram of a system for receiving, distributing, and displaying video content according to some embodiments.

This example includes three different representations for media of total length 300 seconds. For the primary view 'primary', a representation with 30 segments of length 10 second and video frame resolution of 1920×1080 and 6.8 Mbs is used. For a zoomed view 'zoom1' a representation with 30 segments of length 10 second and video frame resolution of 1920×1080 and 6.8 Mbs is used. For the channel change stream corresponding to zoom1, namely An example of a client device that may be used in some embodiments is the client device illustrated in the functional block diagram of FIG. 6A. The client device in FIG. 6A is configured with a plurality of decoders to receive and simultaneously decode a plurality of streams, such as a stream of un-zoomed content and one or more channel-change streams of zoomed content.

Client Device for Locally-Generated Zoomed Video.

Figure 6B:
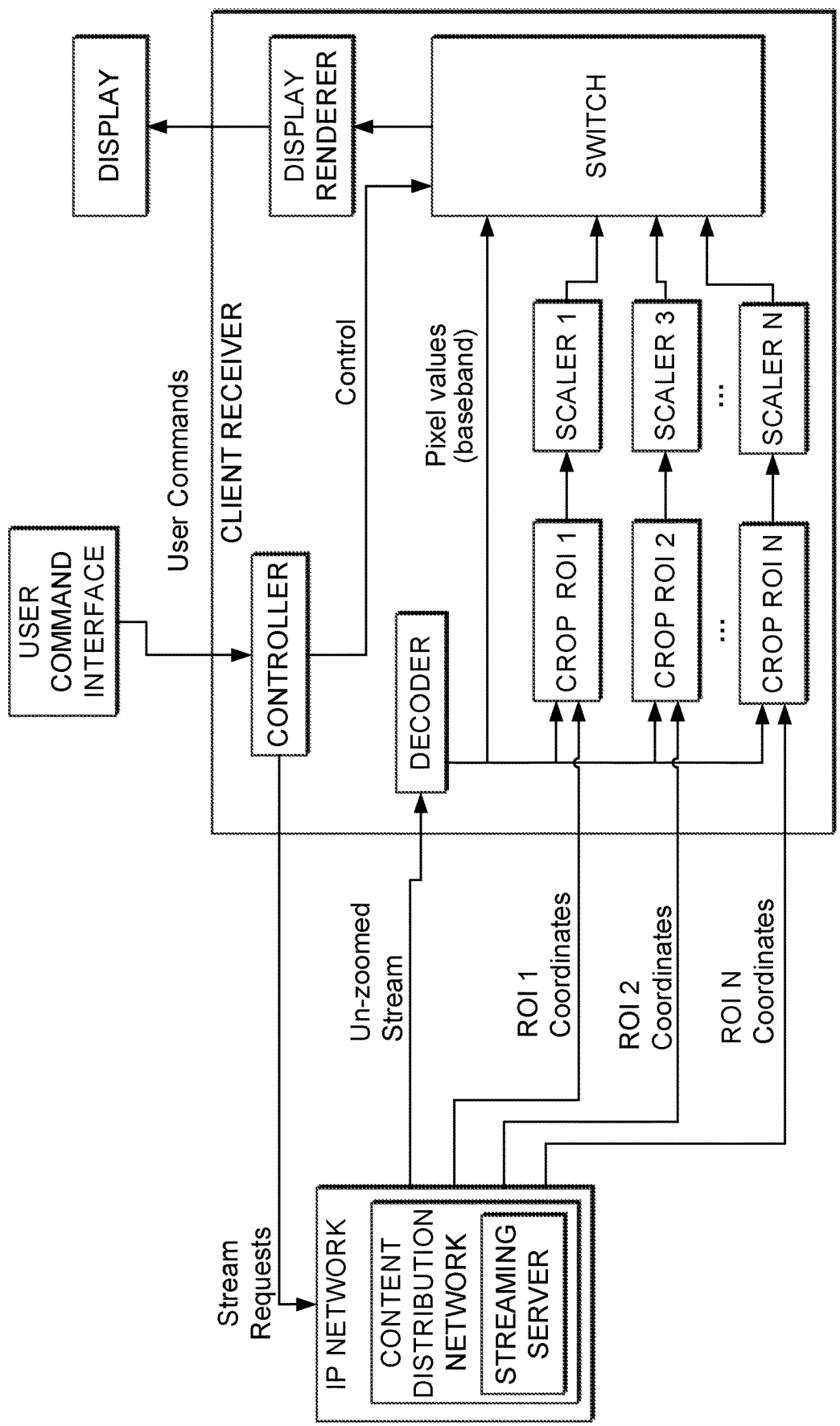
FIG. 6B is a functional block diagram of another system for receiving, distributing, and displaying video content according to some embodiments.

An example of another client device that may be used in some embodiments is the client device illustrated in the functional block diagram of FIG. 6B. The client device in FIG. 6B is configured to receive and decode an un-zoomed stream to baseband pixel values. The client device in FIG. 6B is further configured to crop and scale the decoded un-zoomed stream according to metadata identifying the coordinates of different regions of interest. The cropping and scaling of the different regions of interest creates locally-generated zoomed video corresponding to each signaled region of interest. In response to an appropriate user input selecting a region of interest, the client device operates to switch to displaying the locally-generated zoomed video corresponding to the selected region of interest. The switching may be performed with little to no perceptible latency, e.g. within a single frame time after the selection of the region of interest.

An embodiment according to FIG. 6B uses locally-generated zoomed streams by cropping and upscaling the primary video feed after it is decoded to baseband to generate zoomed streams that are ready in baseband video buffers for instantaneous switchover. The headend performs the original object detection/selection and sends to the client, on a per frame basis, coordinates of the zoom regions of interest. The client uses this information to crop the decoded video in baseband and up-scales it back up to full resolution. This process may be repeated for all zoom views. Thus, when a user wants to switch to a zoomed view, all zoomed baseband frames are available in local memory. This results in a low-latency switch to the requested zoomed mode. In the meantime, the client application may request the full-resolution version of the zoomed stream. When the full resolution streams are available, the player switches to them (instead of the locally cropped and upscaled version, which is of poorer quality).

In some embodiments, coordinates of the regions of interest as illustrated in FIG. 6B are provided to a client device of FIG. 6A. Using those coordinates, the client device of FIG. 6A may, for example, display to a user an indication of those regions within the un-zoomed stream that correspond to different available zoomed streams. (Indications such as the outlining of FIG. 2B may be used.) Coordinates may be provided in the form of, for example, x and y coordinates of diagonally opposite corners of a bounding box defining the region or object of interest, or in other forms, such as an x and y coordinate of one corner of a bounding box along with x and y dimensions of the box. In some embodiments, shapes other than box (rectangular) shapes may be used, and appropriate parameters are sent for the corresponding shape.

In some embodiments, methods described above are combined to provide greater flexibility in the generation of zoomed video. For example, a content server may advertise the availability of a 2× zoomed stream and a 4× zoomed stream for a particular object of interest. In response to a user input indicating that the user wishes to view a 3× zoomed video of a selected object of interest, the client device may locally generate a 3× zoomed video of the object of interest and concurrently request the 2× zoomed stream. The client up-scales the 2× zoomed stream (by 1.5×) to generate a higher-quality 3× zoomed stream. The client switches to display of the higher-quality 3× zoomed stream once it is available. In some embodiments, the client retrieves the zoomed stream with the highest zoom factor that is less than or equal to the zoom factor requested by the user. In some embodiments, the client retrieves the zoomed stream with the lowest zoom factor that is greater than or equal to the zoom factor requested by the user. For example, in a case where the content server advertises the availability of a 2× zoomed stream and a 4× zoomed stream for the object of interest, the client device, in response to user input requesting a 3× zoomed video, may request the 4× zoomed stream and then down-scale the 4× zoomed stream to a 3× zoomed stream for display to the user.

Figure 11:
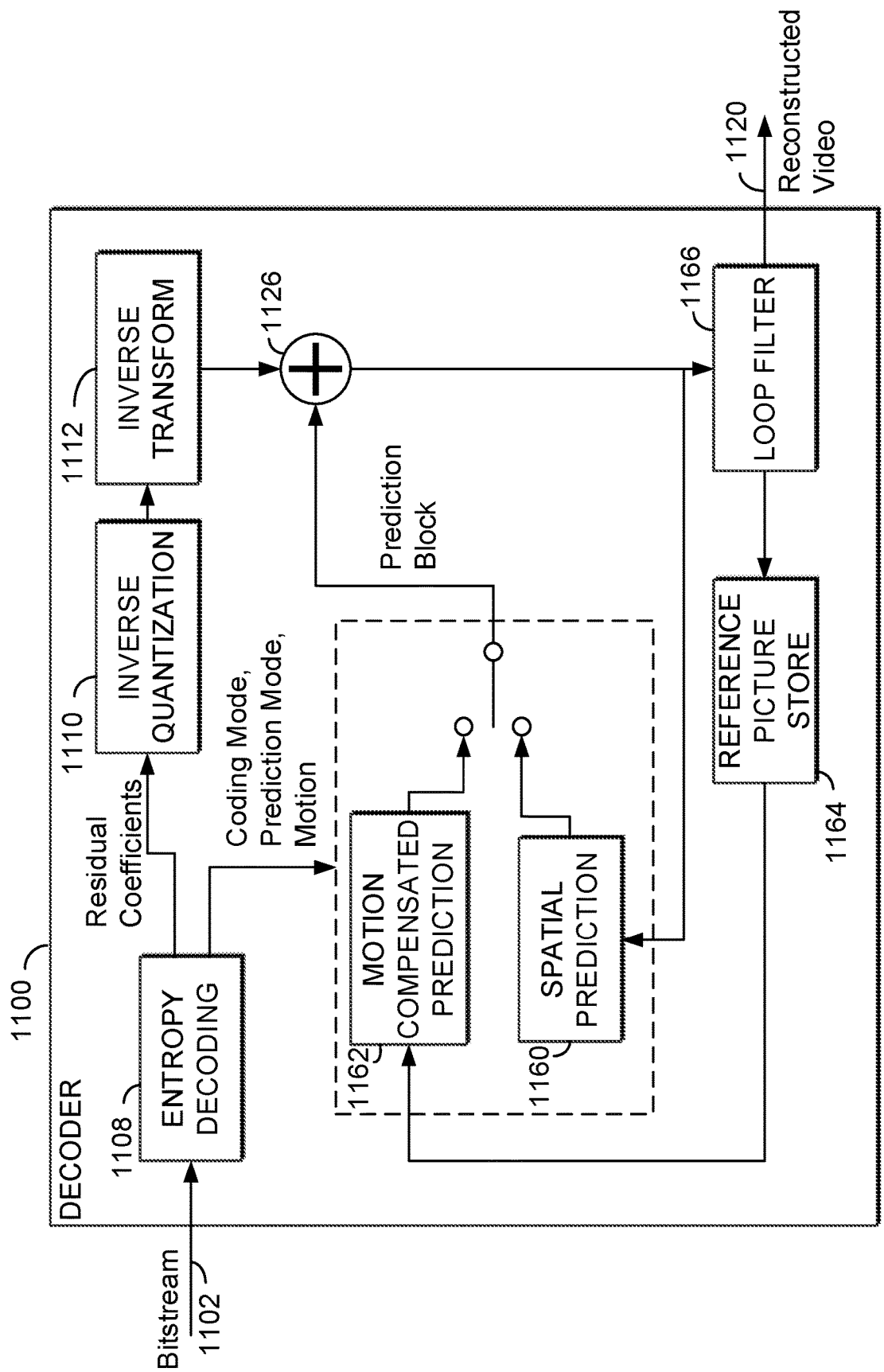
FIG. 11 is a block diagram of the functional architecture of a block-based decoder that may be used in some embodiments.

FIG. 11 is a functional block diagram of a block-based video decoder 1100. Each of the decoders within the single-decoder client of FIG. 6B or the multi-decoder client of FIG. 6A may be implemented using the functional architecture of decoder 200. In the embodiment of FIG. 11, a received video bitstream 1102 is unpacked and entropy decoded at entropy decoding unit 208. The coding mode and prediction information are sent to either the spatial prediction unit 1160 (if intra coded) or the temporal prediction unit 1162 (if inter coded) to form the prediction block. The residual transform coefficients are sent to inverse quantization unit 1110 and inverse transform unit 1112 to reconstruct the residual block. The prediction block and the residual block are then added together at 1126. The reconstructed block may further go through in-loop filtering at loop filter 1166 before it is stored in reference picture store 1164. The reconstructed video 1120 may then be sent out to drive a display device, as well as used to predict future video blocks. In the case of a client having multiple decoders, such as the client of FIG. 6A, one or more of the decoder components may be shared among the decoders.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Object-Tracked Single Stream.

In some exemplary embodiments, a single stream with an appropriate slice or tile structure may be used for the generation of a single stream of compressed video. In such embodiments, objects or regions of interest that have been identified at the headend may be automatically tracked, and the tracking information is sent down to the receiver. Using this tracking information, a receiver may either locally extract the zoom regions of interest or issue a request to the head end server for alternative ABR streams.

Constructing Zoomed Streams from High-Resolution Slices.

Figure 10:
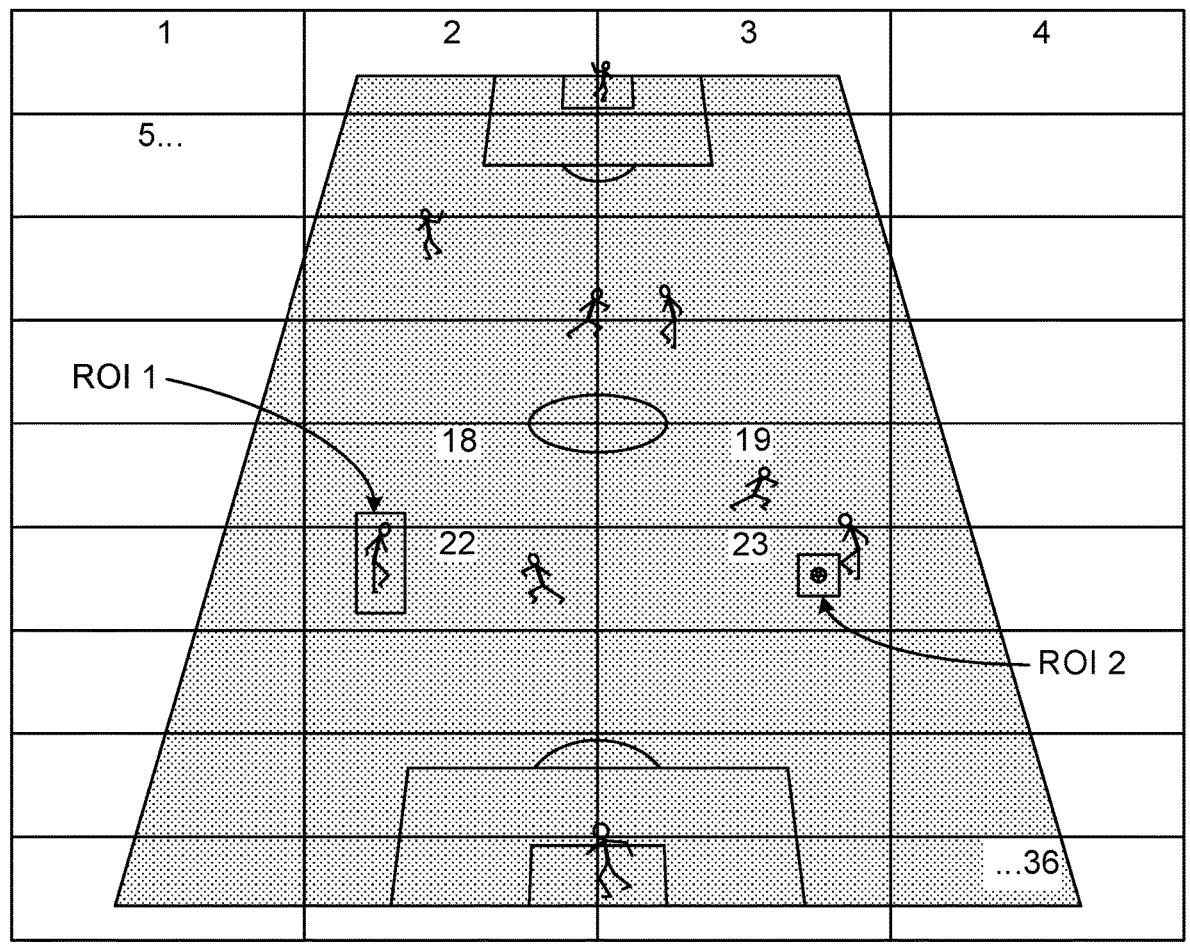
FIG. 10 illustrates a high-resolution video that includes a plurality of separately-decodable slices.

In some embodiments, a client device may operate to construct zoomed streams by requesting selected spatial regions (e.g. slices) from a high-resolution video made available by a server. One such embodiment is illustrated in FIG. 10. FIG. 10 illustrates a still from a high-resolution video (e.g. higher resolution than the original un-zoomed video displayed by the client device). The high-resolution video in FIG. 10 is divided into 36 spatial regions (e.g. slices), numbered 1 through 36. Each slice is separately decodable. The example video of FIG. 10 includes two regions of interest, ROI 1 and ROI 2. The content server provides metadata to the client indicating the location of the regions of interest within the high-resolution video. This location data may be provided as pixel coordinates of the regions of interest within the full video or as other parameters. A client device, in response to receiving a user selection of a region of interest, selects an appropriate slice or slices to retrieve from the high-resolution video. For example, in response to a user selection of ROI 1, the client device may request from the server slices numbered 18 and 22. In response to a user selection of ROI 2, the client device may request from the server slice number 23. The client may initially display a locally-generated zoomed video in response to the client selection until a sufficient amount of the requested slices have been received. The client may continue to receive metadata from the server that indicates the time-dependent locations of the regions of interest, and the client may request different slices at different times to enable continued display of zoomed video of the selected object or objects of interest even as their positions change from one set of slices to another within the high-resolution video.

Display Modes.

In some embodiments, a client bases its selection of a download mechanism at least in part on the selected viewing mode. For example, if the zoomed view is in full screen mode, then the video to be processed may be the zoomed view alone (unless channel-change streams are also being processed). Also, in this case, the best resolution available is preferably presented for rendering. Hence, if the client chooses full screen view of the zoomed mode, then the specific zoomed stream will be requested from the server (e.g. specific slices may be requested from the server). The content received from the server is then decoded and rendered by the client. Until the zoomed stream is available, a local crop of the zoomed region may be upscaled and rendered to effect a low-latency (e.g. apparently instantaneous) switch.

Exemplary Embodiment with Default Initial Zoom Factor.

In one exemplary embodiment, a server advertises metadata with location and extent of each zoomable object. A video client displays indications/highlights of the zoomable objects. A user selects an object for zoom. The object (or, e.g., the corresponding bounding box), is highlighted to confirm its selection to the user. The object expands into a default zoomed view which is rendered forward in time. An initial zoom factor may be a default zoom factor and may be conveyed in metadata. As the user continues to watch the zoomed view of the selected object, the client may use subsequent metadata to keep the object of interest within the zoomed view. The user may adjust the extent of the zoom using a 'pinch-to-zoom' gesture on a touch screen or touch pad. Client rendering continues to center on the zoomed object, while adjusting to the new extent. The desired zoom factor at a given time may be realized either by local scaling of received content or by requesting and transitioning to a higher/lower resolution alternative stream, as applicable.

Figure 7A:
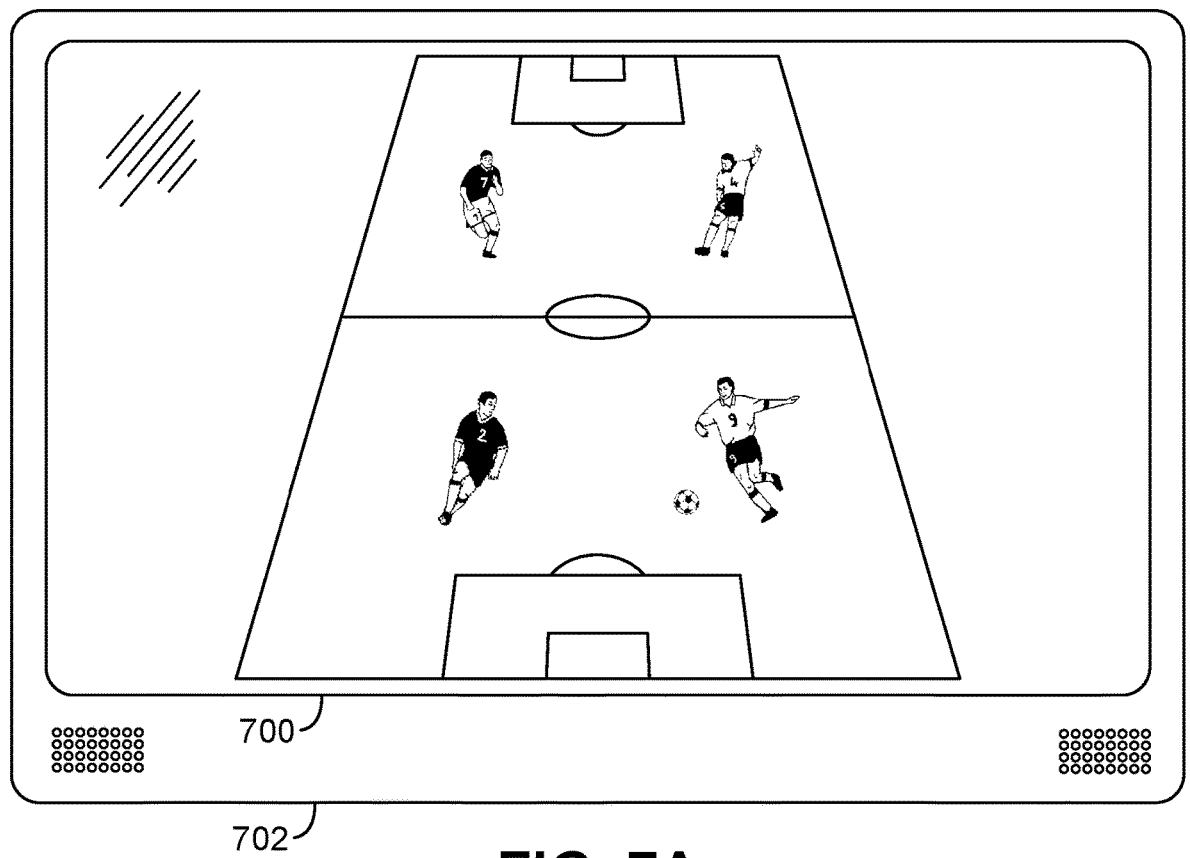
FIGS. 7A-7F illustrate the appearance of a video and user interface elements on a client display device during performance of a method according to one embodiment.
Figure 7B:
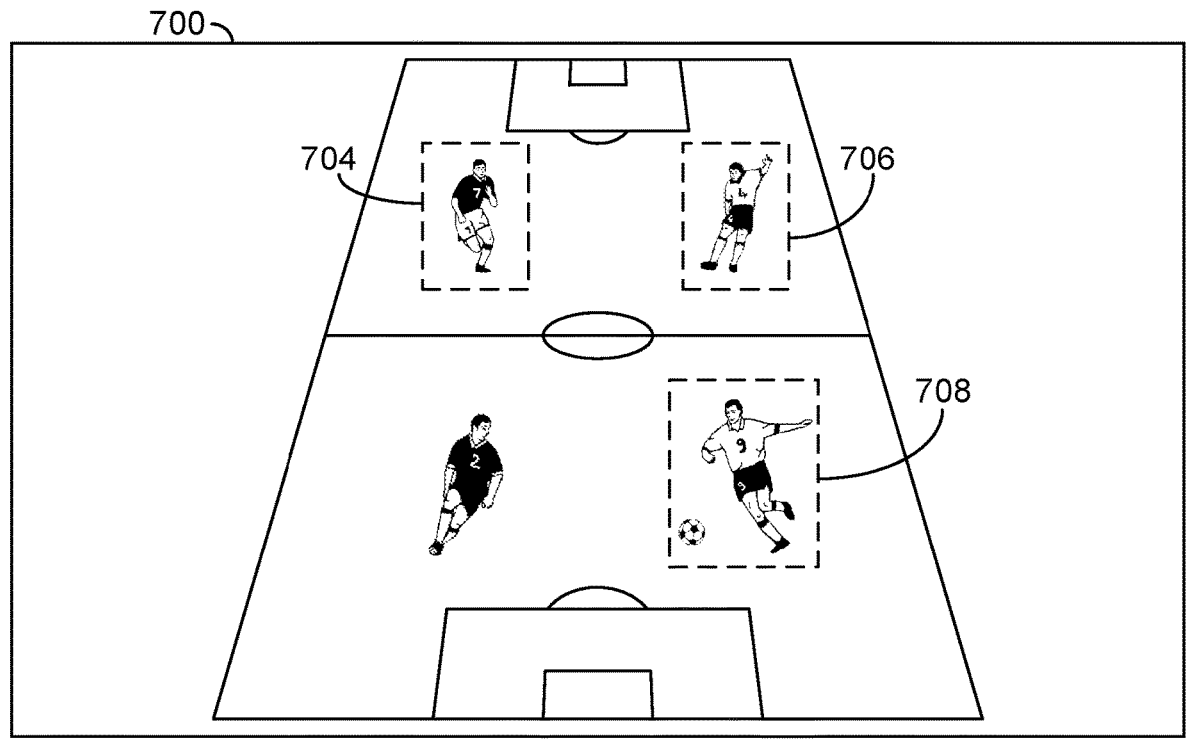
Figure 7C:
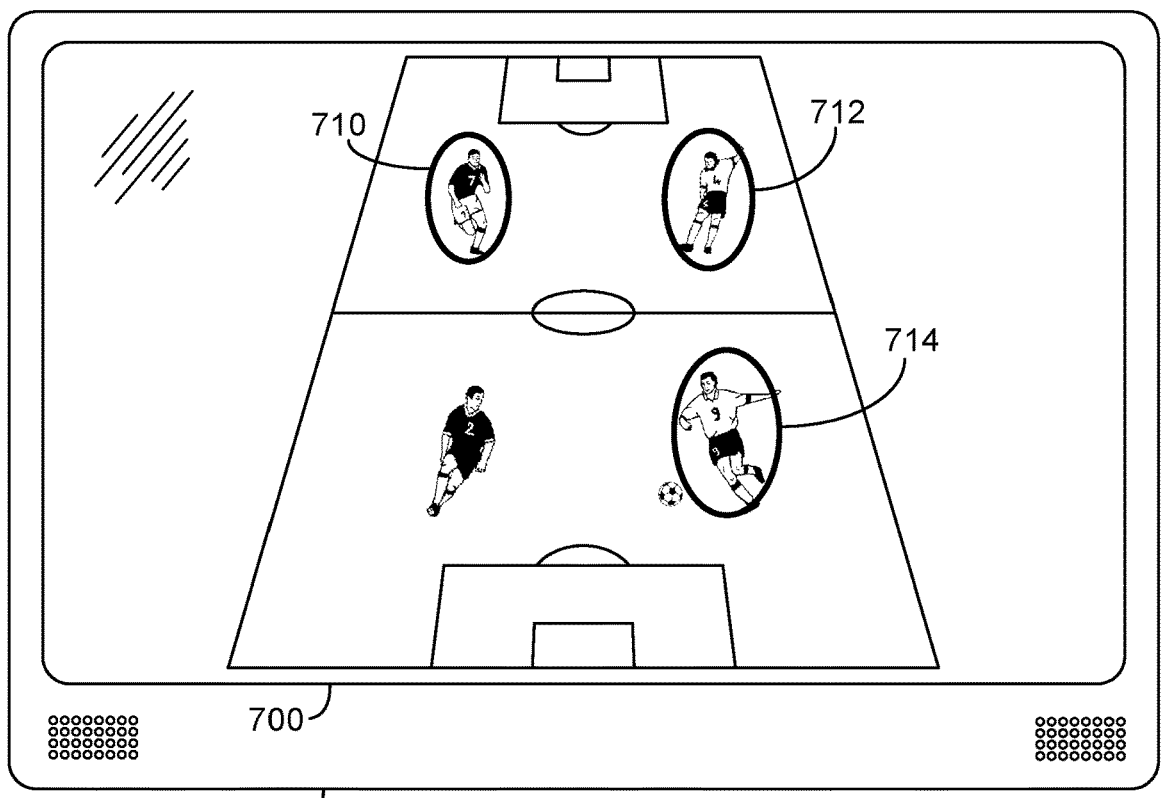

One such exemplary embodiment is illustrated in FIGS. 7A-7F. FIG. 7A illustrates an exemplary un-zoomed video 700 from a soccer game as displayed on a client device 702. A video content server may send to the client metadata indicating the positions of objects of interest, e.g. by sending bounding box coordinates. FIG. 7B illustrates exemplary bounding boxes 704, 706, 708 of respective objects of interest within the video 700 are illustrated using dashed rectangles. In different embodiments, the extent of the bounding boxes may or may not be displayed on the client device. In some embodiments, objects of interest are highlighted using shapes that are different from the shape of the bounding box, for example using the elliptical outlines 710, 712, 714 illustrated in FIG. 7C. Other techniques of highlighting objects of interest may alternatively be used.

Figure 7D:
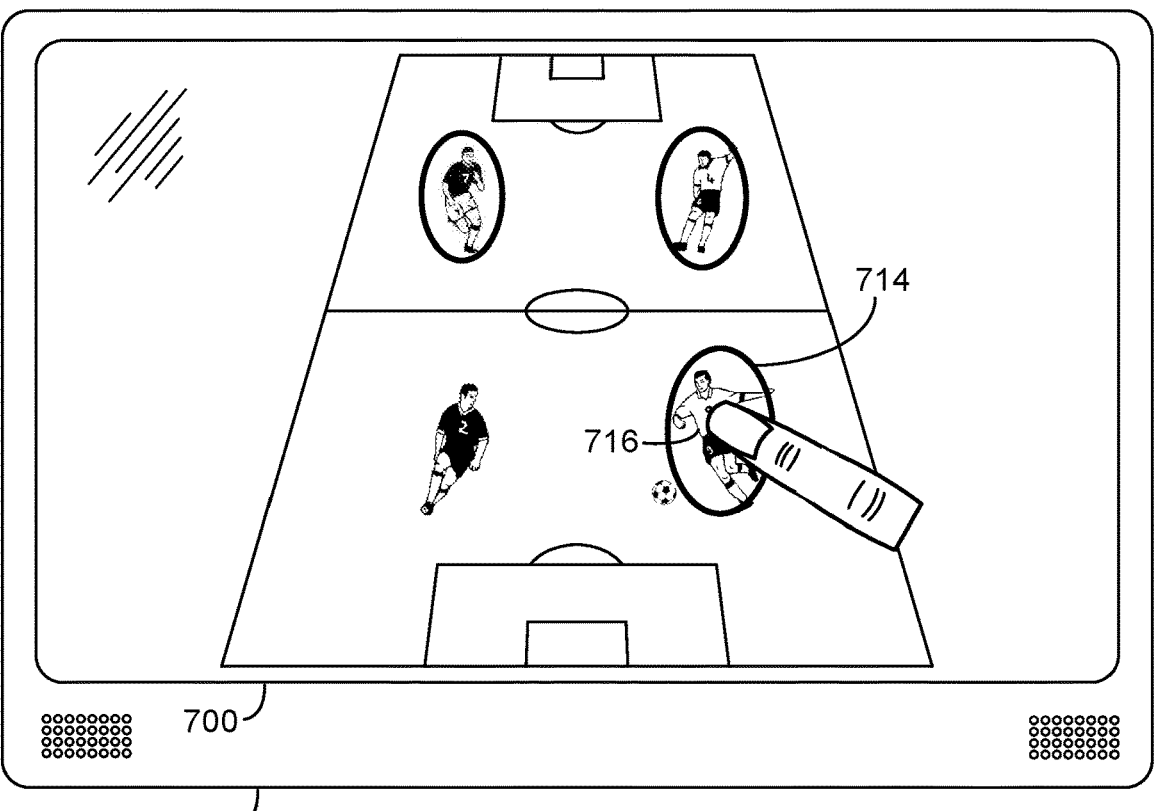

In FIG. 7D, a user has provided an input through a touch screen of client device 702 to select the object of interest 716 indicated by the elliptical outline 714 to be displayed in a zoomed form. FIG. 7D illustrates a situation in which the user has selected a particular athlete.

Figure 7E:
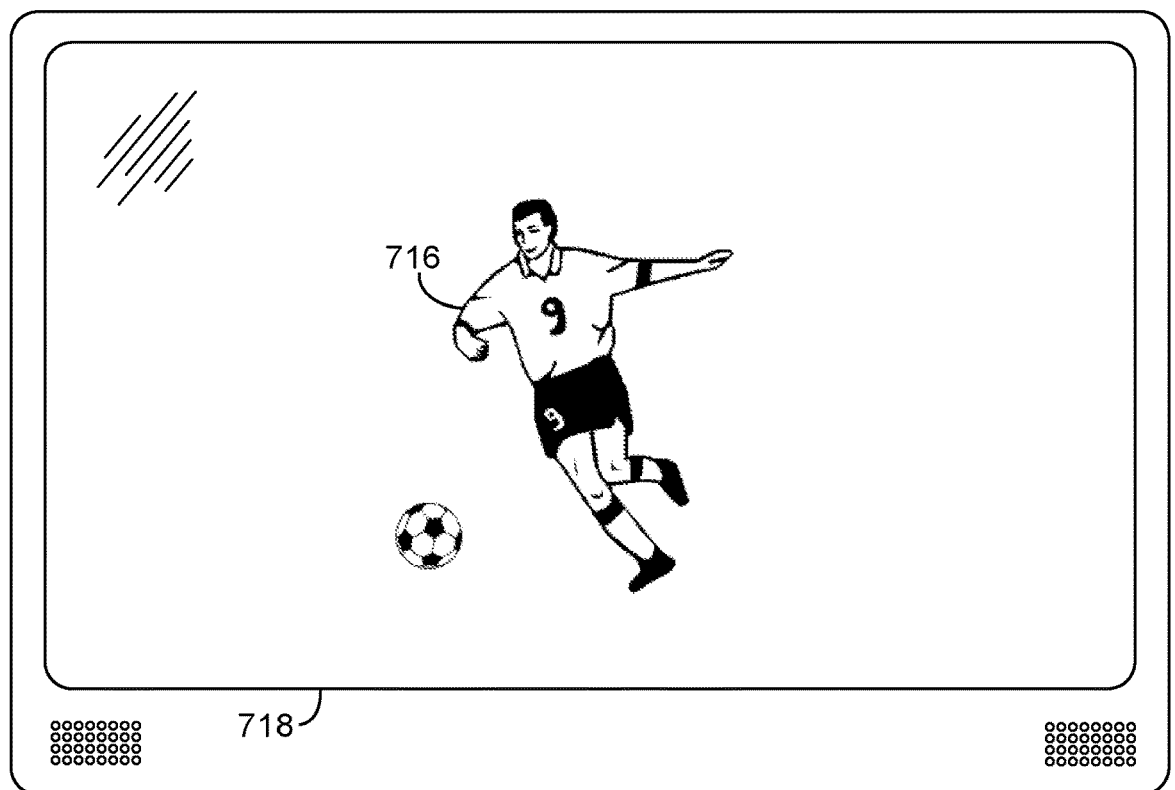

In response to selection of the object of interest 716, using techniques described in greater detail above, the client device causes display of a zoomed video 718 substantially centered on the selected object of interest, as illustrated in FIG. 7E. As described above, the zoomed video 718 may be locally generated zoomed video, it may be a zoomed video retrieved from a server, or it may be a zoomed video that is initially locally generated and that subsequently switches to a video retrieved from a server. The zoom factor used in the initial zoomed video (as compared to the un-zoomed video) may be a user-selected default value, it may be a value communicated from the server (e.g. explicitly communicated or implicitly communicated through bounding box coordinates from which the zoom factor may be derived, among other alternatives).

Figure 7F:
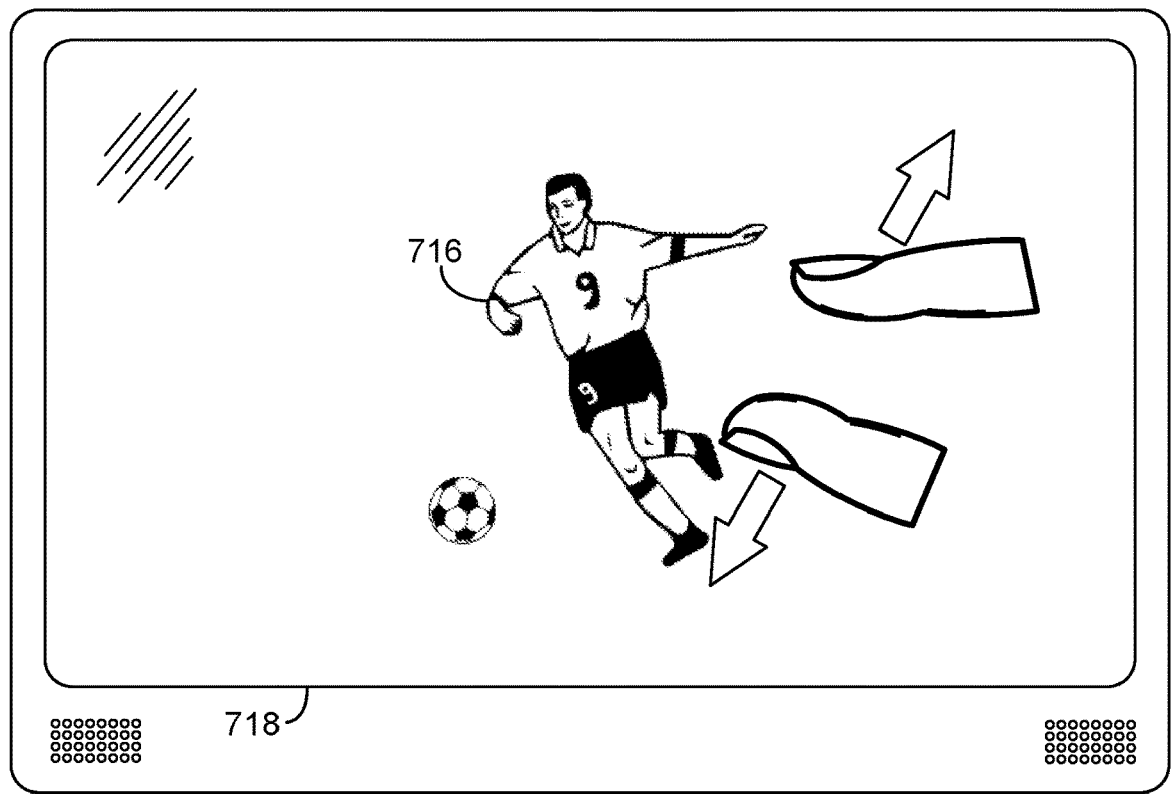

As illustrated with respect to FIG. 7F, in some embodiments, the client device enables the user to change the zoom factor through a pinch-to-zoom touch-screen input or through other input. In the illustration of FIG. 7F, the user is performing an expanding-pinch gesture on the touch screen. The client device interprets the gesture as an instruction to increase the zoom factor. (For example, the change in the zoom factor may be proportional to the change in distance between touch points, or the change in the zoom factor may be equal to the ratio between the final distance between the touch points and the initial distance between the touch points, among other options.) After the user has input a pinch-to-zoom gesture to increase the zoom factor, the zoomed video continues to follow (e.g. to be substantially centered on) the selected object of interest, even though the selected object of interest may change position within the original un-zoomed video. Maintaining the centering of the object of interest may be performed by cropping received video (which may be an original un-zoomed video or may be a partly zoomed video) such that the object of interest is substantially centered in the remaining video (followed by appropriate scaling). Coordinates of the object of interest itself (or of a corresponding bounding box) may be received on a frame-by-frame basis, e.g. communicated in-stream in the private data section of the video. It should be noted that the zoomed video is not necessarily centered exactly on the object of interest. For example, the displayed area may be selected so as to avoid rapid changes in the frame of the zoomed video 718, e.g., to prevent the appearance of "camera shake").

In a variation of the embodiment of FIGS. 7A-7F, the expanding-pinch gesture does not immediately adjust the zoom level but rather selects the object and establishes a visible bounding rectangle defined by the gesture. Upon completion of the gesture, the client executes a zoom where the zoom factor is determined based on the extent of this user-defined bounding rectangle.

Exemplary Embodiment with User-Input of Initial Zoom Factor.

Figure 8A:
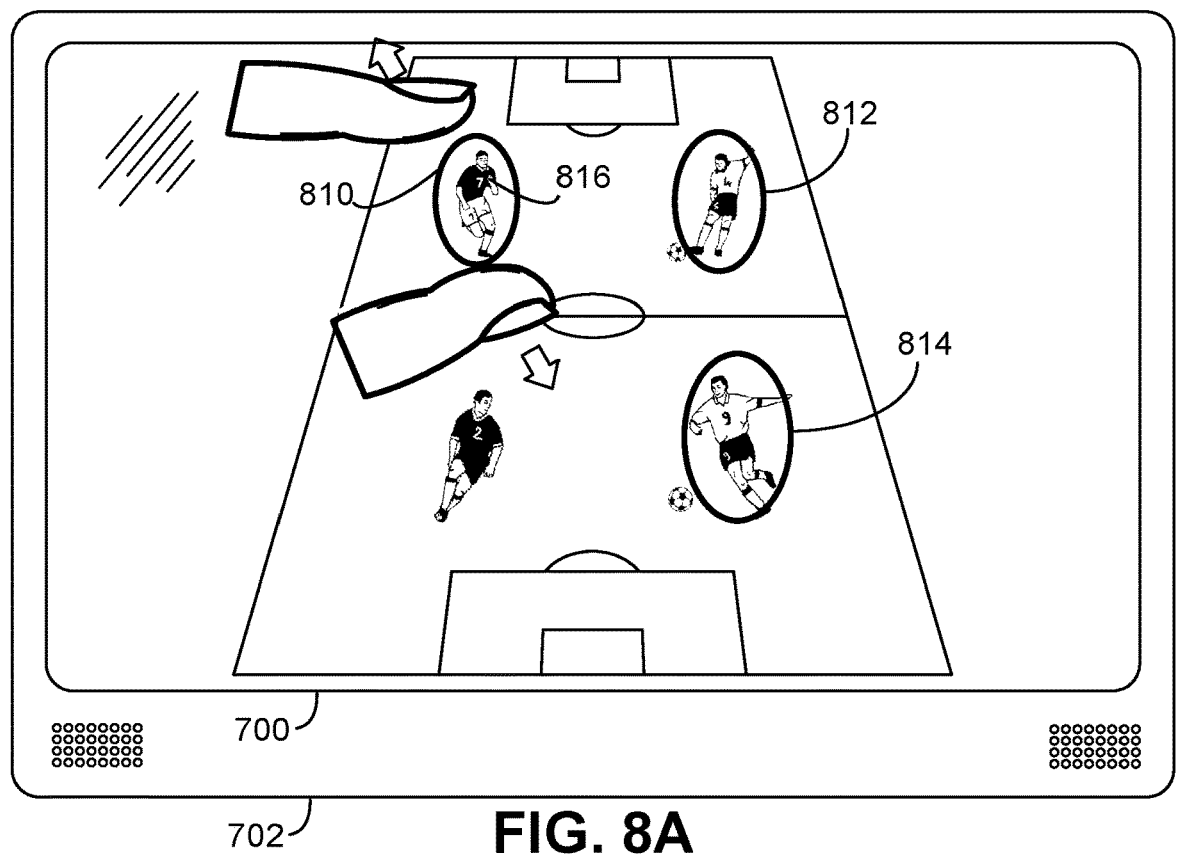
FIGS. 8A-8B illustrate the appearance of a video and user interface elements on a client display device during performance of a method according to another embodiment.

In some embodiments, a user input may operate to select both a particular object of interest and a zoom factor to be used for display of the object. In one such embodiment, illustrated in FIGS. 8A-8B, a server advertises metadata identifying location and extent of each zoomable object of interest in an un-zoomed video 700. The client 702 processes the metadata to display indications of the zoomable objects. In the embodiment of FIG. 8A, the availability of a zoomable object is indicated by a respective oval 810, 812, 814, though other indicators may alternatively be used (e.g. highlighting of the zoomable objects). The user executes an 'expanding-pinch' gesture over object of interest 816. The client uses the initial location of the pinch gesture to determine which object the user is selecting. In some embodiments, this is done by identifying the two points initially touched by the user, determining the midpoint of those two points, and identifying a bounding box within which the midpoint is located. The selected object, or bounding box, may be highlighted to confirm its selection to the user. The zoom factor to be used is determined by the extent of the users expanding-pinch gesture. Thus, in this exemplary embodiment, the client device interprets the users pinch-to-zoom gesture as an input that operates both to select the object of interest and to select the initial zoom factor.

Figure 8B:
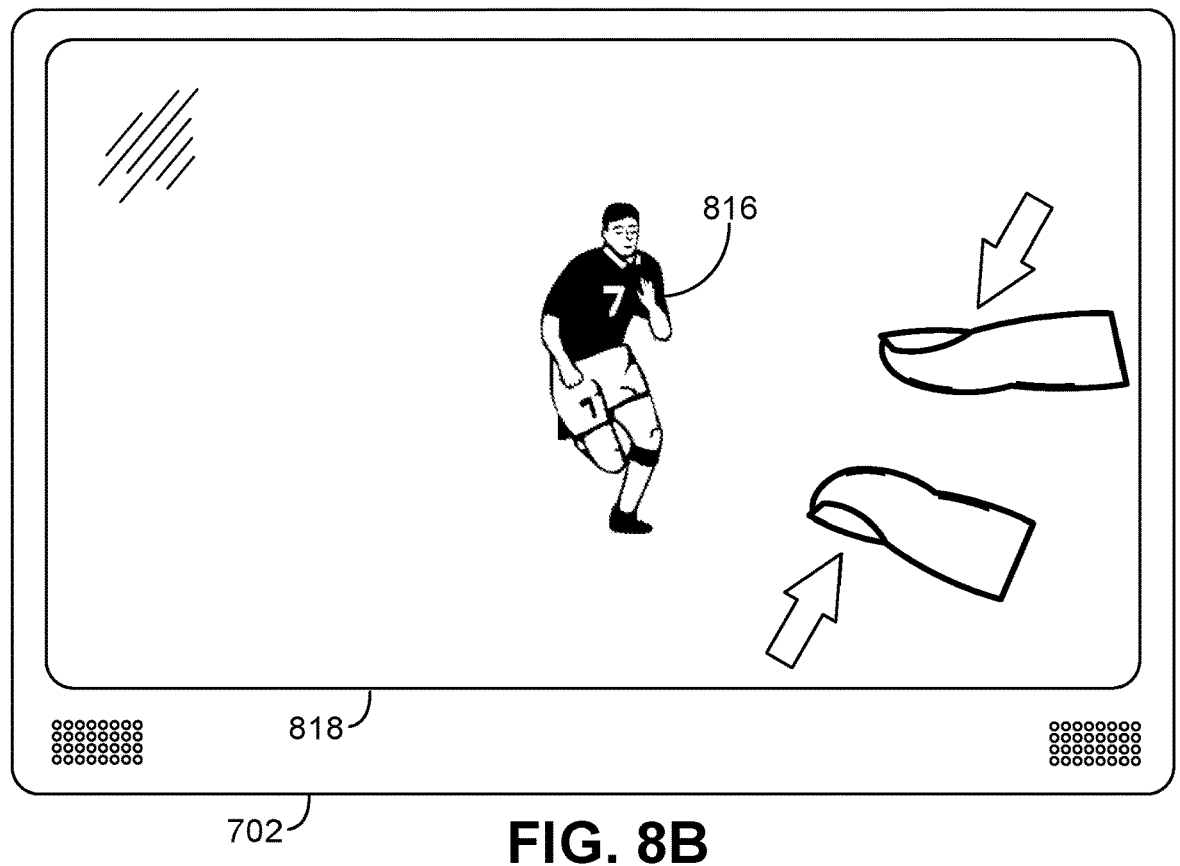

In response to the input, as illustrated in FIG. 8B, the client 702 renders zoomed video 818 that is substantially centered on the tracked zoomed object 816 and that uses the zoom factor indicated by the expanding-pinch input. The zoomed video continues to center on the initially-selected object of interest, even though that object of interest may change position with respect to the original un-zoomed video. The zooming at a given time may be effected either by local scaling of received content or by requesting and transitioning to a higher/lower resolution alternative stream, as applicable. Subsequent pinch gestures may serve as input to indicate further adjustment of the zoom factor. For example, as illustrated in FIG. 8B, the user is providing a contracting-pinch input. The client responds to the input by reducing the zoom factor; however, the zoomed video continues to be centered on object 816.

Exemplary Embodiment with Multi-Object Selection.

Figure 9A:
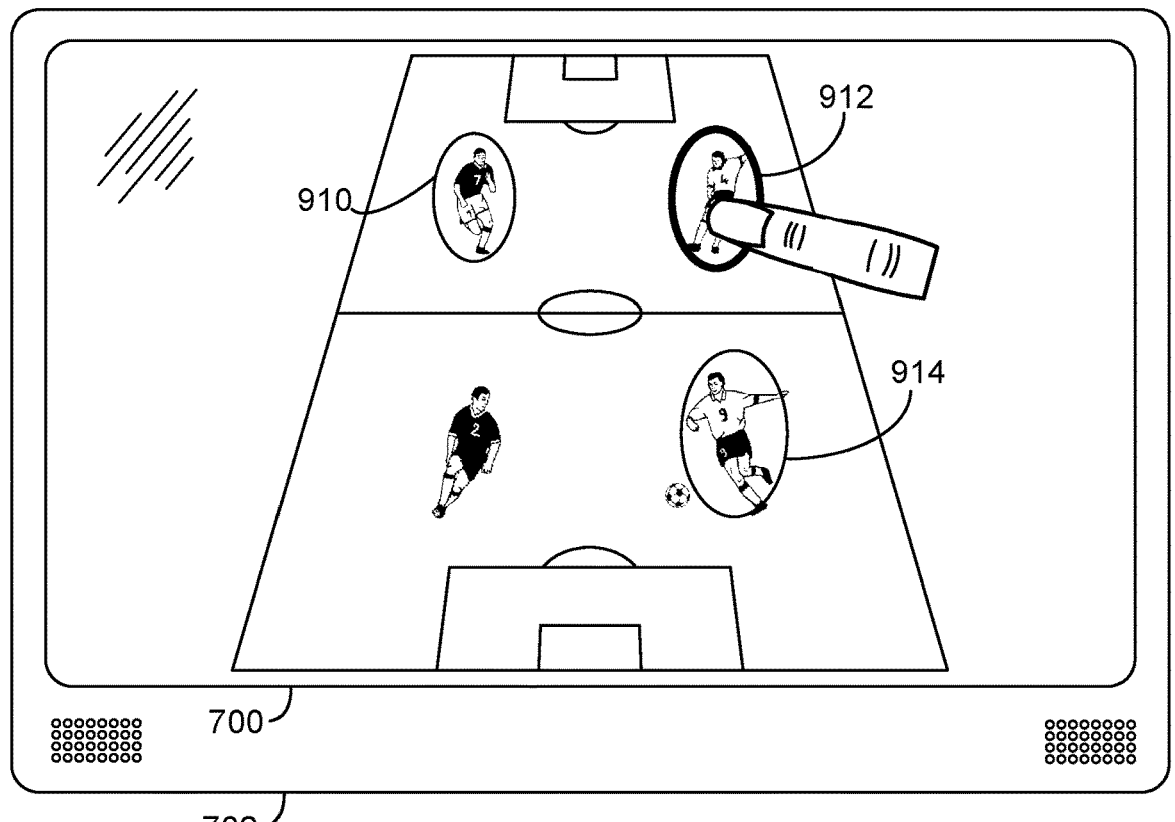
FIGS. 9A-9D illustrate the appearance of a video and user interface elements on a client display device during performance of a method according to a further embodiment.
Figure 9B:
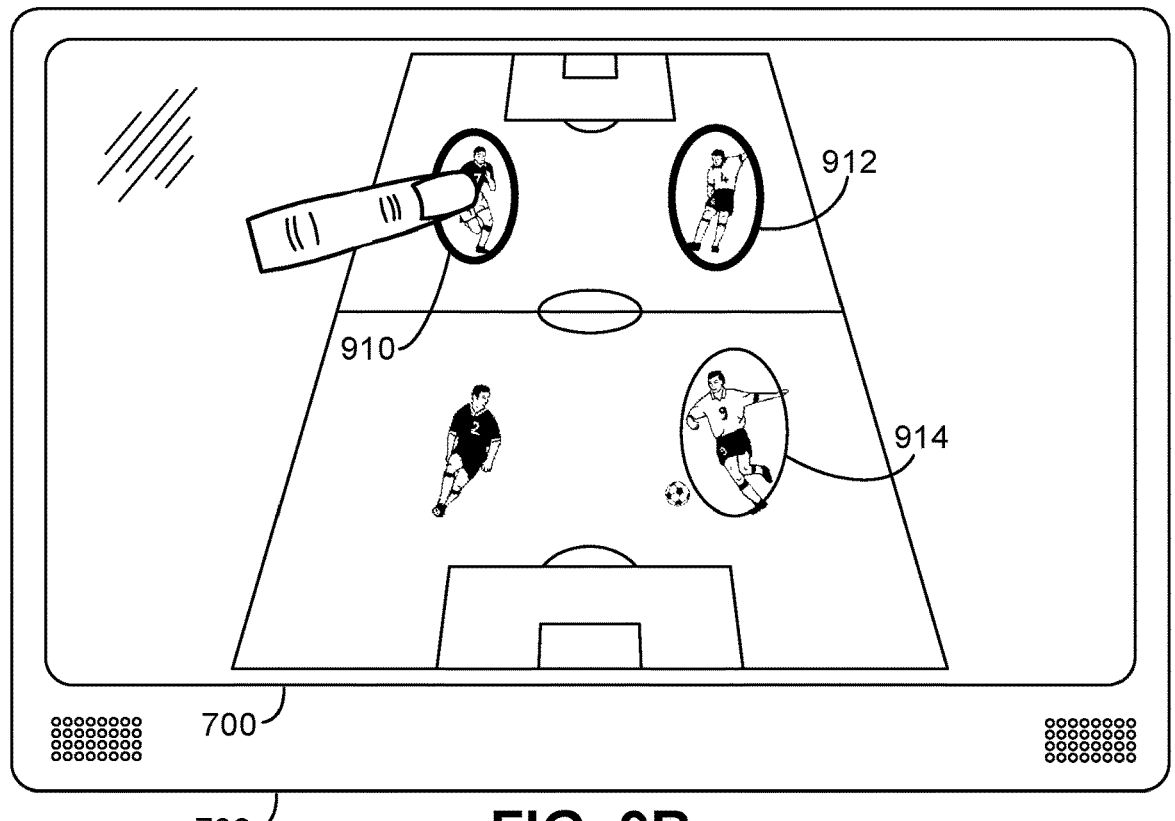

Some embodiments operate to enable aggregate selection of multiple objects for combined zoom view. In an exemplary embodiment illustrated with respect to FIGS. 9A-9D, the server advertises metadata with location and extent of each zoomable object. The client receives the metadata and highlights or otherwise displays indications of the zoomable objects. The selection of each object may be effected by an individual finger tap on a touch screen, for example. The objects are highlighted to confirm their selection to the user. As illustrated in FIG. 9A, the client device 702 provides indicators 910, 912, 914 of respective available zoomable objects. In FIG. 9A, the user selects the object corresponding to indicator 912. The indicator may change in appearance (e.g. by becoming brighter, darker, or a different shape or color) to indicate that the object has been selected. In FIG. 9B, the user selects the object corresponding to indicator 910.

Figure 9C:
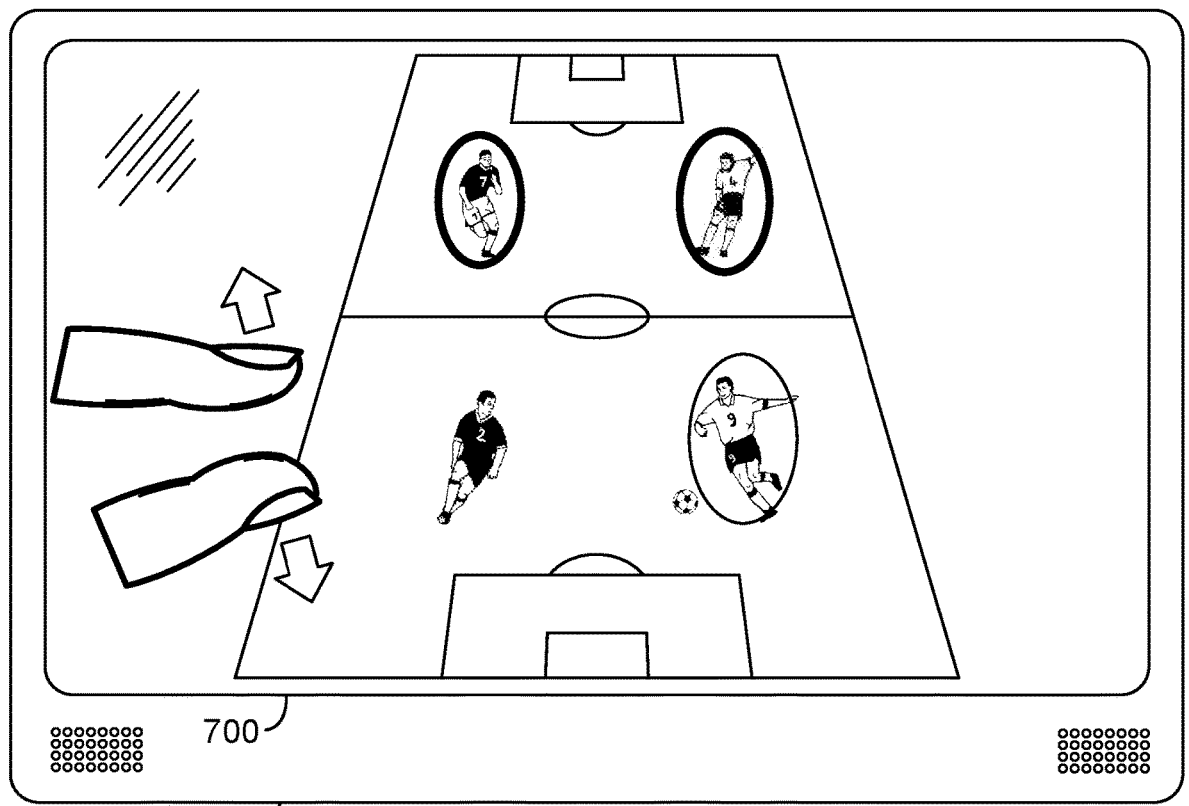
Figure 9D:
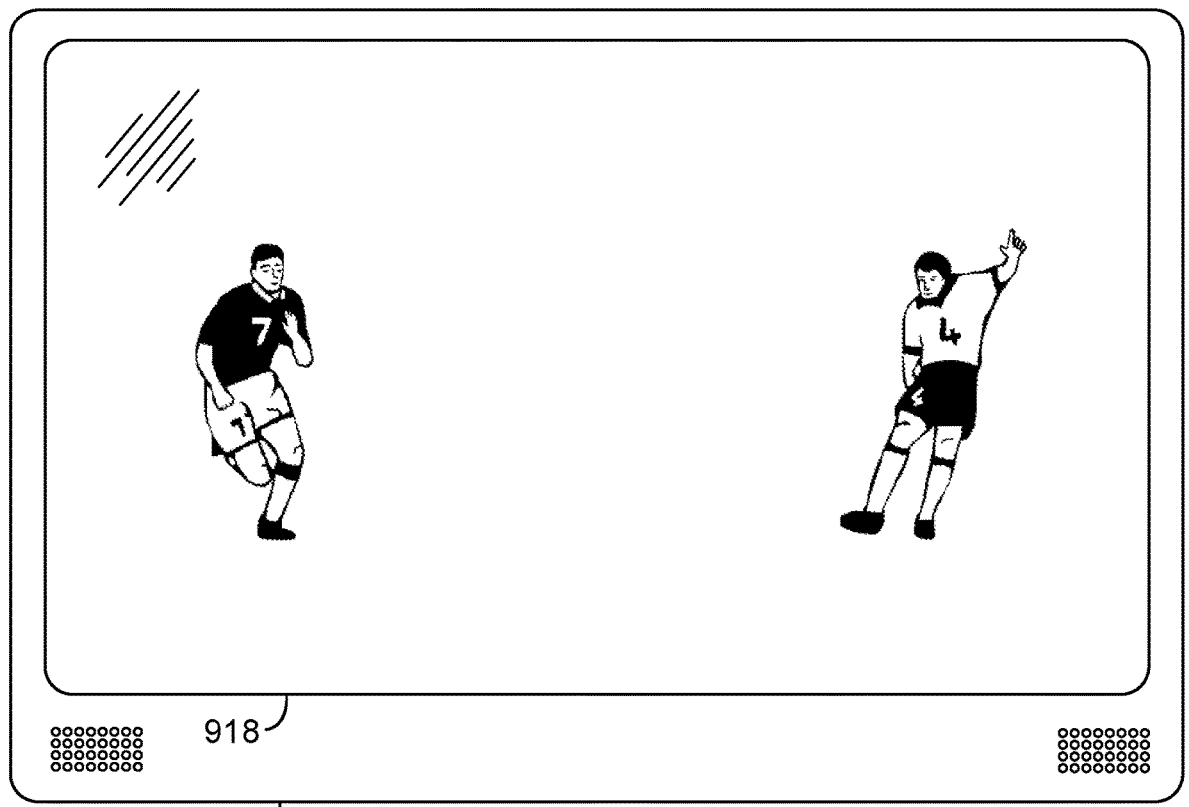

In this example, during the selection process, the client does not yet execute a zoom action. Instead, the client awaits further input. As illustrated in FIG. 9C, the user executes an expanding pinch gesture on the touch screen. The client interprets this input as an instruction to execute the zoomed view going forward. In response, the client 702 expands the view, adjusting the zoom factor based on the extent of the expanding pinch gesture. As illustrated in FIG. 9D, a zoomed video 918 encompassing both selected objects is displayed on the client device.

In the embodiment of FIGS. 9A-9D the center of the zoomed video 918 is selected based on the plurality of selected objects of interest. For example, a bounding box may be generated so as to encompass bounding boxes of all respective selected objects, and the zoomed video may be centered on the center of the generated bounding box. Alternatively, the client may calculate a mean location from the locations of the respective zoomed images and use the mean location as the center of the aggregate zoomed video 918. In some embodiments, the position of a particular user-selected object may serve as the position of the center of the aggregate zoomed video. The center of the aggregate zoomed video may be updated on a frame-by-frame basis. Other techniques may alternatively be used to select the center of the aggregate zoomed view. The aggregate zoomed video may be generated by, for example, local cropping and zooming of the original un-zoomed video.

As the aggregate zoomed video is displayed, the client device may monitor for client input changing the zoom factor. For example, the client may detect a pinch-to-zoom gesture to further adjust the zoom factor of the aggregate zoomed video.

In some embodiments, the client device automatically adjusts the zoomed view. One factor that may be used by the client device in adjusting the zoomed view is the changing position and spatial relationship of the selected objects of interest over time. For example, if the objects become farther apart in the un-zoomed video, the client may automatically reduce the zoom factor automatically (effectively "zooming out") to maintain the full set of selected objects in view. Another factor that may be used by the client device in adjusting the zoomed view is detection that a selected object of interest is no longer displayed in the un-zoomed video. For example, if an object is no longer visible in the main view (and no longer available as an alternative zoomed stream), then the client may remove the object from the aggregate zoomed view. From that point forward, the view may be generated using a bounding box comprising the reduced set of selected objects, with the no-longer available object removed. The zoom factor may likewise be adjusted when an object is no longer visible, e.g. a previous "zoom out" action due to object divergence may be reversed if a divergent object disappears from the main view, e.g. travels beyond the edge of the main view video content.

In an alternative embodiment, detection by the client device of an expanding-pinch gesture does not immediately trigger an adjustment of the zoom level but rather selects one or multiple objects and establishes and displays a visible bounding rectangle defined by the gesture. In response to completion of the gesture, the client executes a zoom where the zoom factor is determined based on the selected objects and the extent of this user-defined bounding rectangle. This allows the multiple object selection and the initial setting of zoom factor using a single gesture.

Exemplary Client Device.

Exemplary embodiments disclosed herein are implemented using one or more wired and/or wireless network nodes, such as a wireless transmit/receive unit (WTRU) or other network entity.

Figure 12:
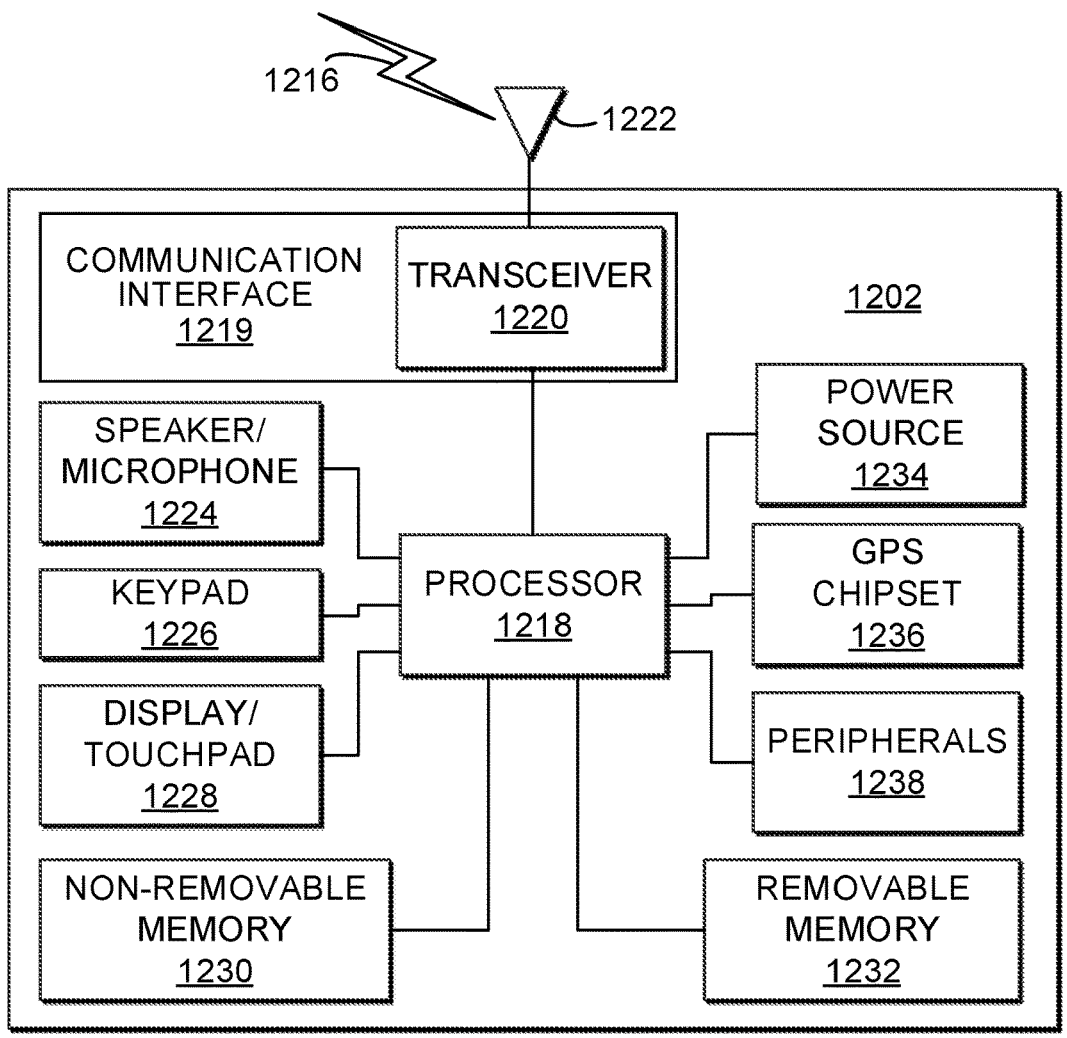
FIG. 12 is a block diagram of the functional architecture of an exemplary wireless transmit/receive unit (WTRU) that may be employed as a client device in some embodiments.

FIG. 12 is a system diagram of an exemplary WTRU 1202, which may be employed as a client device in embodiments described herein. As shown in FIG. 12, the WTRU 1202 may include a processor 1218, a communication interface 1219 including a transceiver 1220, a transmit/receive element 1222, a speaker/microphone 1224, a keypad 1226, a display/touchpad 1228, a non-removable memory 1230, a removable memory 1232, a power source 1234, a global positioning system (GPS) chipset 1236, and sensors 1238. It will be appreciated that the WTRU 1202 may include any sub-combination of the foregoing elements while remaining consistent with an embodiment.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 12 depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, as examples. In yet another embodiment, the transmit/receive element 1222 may be configured to transmit and receive both RF and light signals. It will be appreciated that the transmit/receive element 1222 may be configured to transmit and/or receive any combination of wireless signals.

In addition, although the transmit/receive element 1222 is depicted in FIG. 12 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, as examples.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234 and may be configured to distribute and/or control the power to the other components in the WTRU 1202. The power source 1234 may be any suitable device for powering the WTRU 1202. As examples, the power source 1234 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Exemplary Server.

Figure 13:
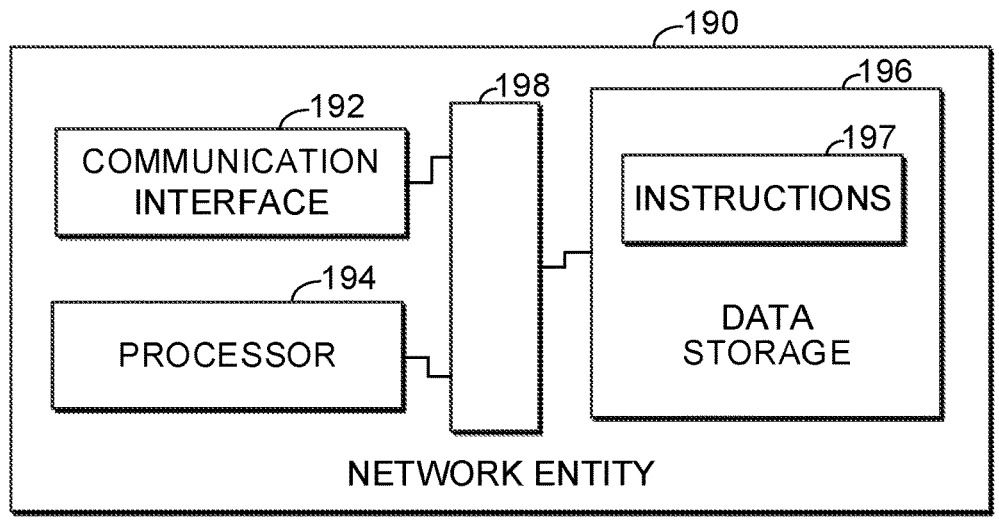
FIG. 13 is a block diagram of the functional architecture of an exemplary network entity that may be employed as a server in some embodiments.

FIG. 13 depicts an exemplary network entity 1390 that may be used in embodiments of the present disclosure, for example as a server for generating or delivering manifest files and/or video streams according to methods disclosed herein. As depicted in FIG. 13, network entity 1390 includes a communication interface 1392, a processor 1394, and non-transitory data storage 1396, all of which are communicatively linked by a bus, network, or other communication path 1398.

Communication interface 1392 may include one or more wired communication interfaces and/or one or more wireless-communication interfaces. With respect to wired communication, communication interface 1392 may include one or more interfaces such as Ethernet interfaces, as an example. With respect to wireless communication, communication interface 1392 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1392 may be equipped at a scale and with a configuration appropriate for acting on the network side—as opposed to the client side—of wireless communications (e.g., LTE communications, Wi-Fi communications, and the like). Thus, communication interface 1392 may include the appropriate equipment and circuitry (perhaps including multiple transceivers) for serving multiple mobile stations, UEs, or other access terminals in a coverage area.

Processor 1394 may include one or more processors of any type deemed suitable by those of skill in the relevant art, some examples including a general-purpose microprocessor and a dedicated DSP.

Data storage 1396 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 13, data storage 1396 contains program instructions 1397 executable by processor 1394 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   receiving, from a server, a primary video stream;
   receiving, from the server, tracking information for a plurality of tracked objects in the primary video stream, the tracking information indicating a time-varying position of each of the tracked objects;
   displaying the primary video stream, including highlighting the plurality of tracked objects based on the received tracking information; and
   in response to a received user input, the received user input selecting (i) a spatial location associated with a tracked object of the plurality of tracked objects in the primary video stream and the received user input selecting (ii) a zoom factor:
      identifying the tracked object based on the selected spatial location;
      based on the time-varying position of the identified tracked object and the selected zoom factor, cropping and upscaling the primary video stream to generate a first cropped and upscaled video stream that follows the identified tracked object at the selected zoom factor;
      displaying the first cropped and upscaled video stream;
      retrieving from the server a stored zoomed video stream corresponding to the identified tracked object, wherein the zoomed video stream is of better quality than the first cropped and upscaled video stream; and
      switching from display of the first cropped and upscaled video stream to display of the zoomed video stream,
   wherein the plurality of tracked objects correspond to respective zoomed video streams stored in the server, and wherein the retrieved zoomed video stream is one of the zoomed video streams stored in the server.

2. The method of claim 1, further comprising:
   while the first cropped and upscaled video stream is displayed, receiving a subsequent user input to change the zoom factor to a subsequent zoom factor; and
   in response to the subsequent user input:
      based on the time-varying position and the subsequent zoom factor, cropping and upscaling the primary video stream to generate a second cropped and upscaled video stream that follows the identified tracked object at the subsequent zoom factor; and
      displaying the second cropped and upscaled video stream.

3. The method of claim 1, wherein the cropping is performed so as to keep the identified tracked object substantially centered in the first cropped and upscaled video stream as the identified tracked object moves in the primary video stream after the identifying of the tracked object.

4. The method of claim 1, wherein the received user input is an expanding pinch gesture applied to a touch screen, the expanding pinch gesture having initial touch points and final touch points, the method further comprising:
   determining the selected spatial location based on the initial touch points; and
   determining the selected zoom factor based on a change in distance between touch points from the initial touch points to the final touch points.

5. The method of claim 1, further comprising receiving at least one manifest for the primary video stream, wherein the manifest identifies the plurality of tracked objects.

6. The method of claim 1, wherein the tracking information is provided in-stream in the primary video stream.

7. The method of claim 1, wherein the tracking information is provided on a frame-by-frame basis.

8. The method of claim 1, wherein the identifying of the tracked object based on the selected spatial location comprises:
   determining a midpoint of two touch points by the user on a touch screen; and identifying a tracked object having a bounding box that encloses the midpoint.

9. The method of claim 1, wherein displaying the first cropped and upscaled video stream comprises switching from display of the primary video stream to display of the first cropped and upscaled video stream.

10. The method of claim 1, wherein displaying the first cropped and upscaled video stream comprises simultaneously displaying the primary video stream and the first cropped and upscaled video stream.

11. The method of claim 1, wherein the tracking information of each tracked object comprises coordinates of a bounding box of the respective tracked object.

12. The method of claim 1,
   wherein the primary video stream includes a plurality of segments, and
   wherein metadata regarding tracked objects in each segment is provided on a segment-by-segment basis.

13. The method of claim 1, further comprising:
   further highlighting the identified tracked object in response to the identifying of the tracked object.

14. The method of claim 1, further comprising:
   receiving additional user input selecting an additional spatial location in the primary video stream; and
   identifying an additional tracked object based on the additional spatial location;
   wherein the cropping and upscaling is based on the time-varying position of the identified tracked object and of the identified additional tracked object, and
   wherein the first cropped and upscaled video stream follows the identified tracked object and the identified additional tracked object at the selected zoom factor.

15. A client device comprising:
   a network interface;
   a processor; and
   a non-transitory computer-readable medium storing instructions operative, when executed on the processor, to cause the client device to:

receive, from a server, a primary video stream;
receive, from the server, tracking information for a plurality of tracked objects in the primary video stream, the tracking information indicating a time-varying position of each of the tracked objects;
display the primary video stream, including highlighting the plurality of tracked objects based on the received tracking information; and
in response to a received user input on a touch screen, the received user input selecting (i) a spatial location associated with a tracked object of the plurality of tracked objects in the primary video stream and the received user input selecting (ii) a zoom factor:
   identify the tracked object based on the selected spatial location;
   based on the time-varying position of the identified tracked object and the selected zoom factor, crop and upscale the primary video stream to generate a first cropped and upscaled video stream that follows the identified tracked object at the selected zoom factor;
   display the first cropped and upscaled video stream;
   retrieve from the server a stored zoomed video stream corresponding to the identified tracked object, wherein the zoomed video stream is of better quality than the first cropped and upscaled video stream; and
   switch from display of the first cropped and upscaled video stream to display of the zoomed video stream,
   wherein the plurality of tracked objects correspond to respective zoomed video streams stored in the server, and wherein the retrieved zoomed video stream is one of the zoomed video streams stored in the server.

16. The device of claim 15, wherein the instructions are further operative, when executed by the processor, to cause the device to:
   while the first cropped and upscaled video stream is displayed, receive a subsequent user input to change the zoom factor to a subsequent zoom factor; and
   in response to the subsequent user input:
   based on the time-varying position and the subsequent zoom factor, crop and upscale the primary video stream to generate a second cropped and upscaled video stream that follows the identified tracked object at the subsequent zoom factor; and
   display the second cropped and upscaled video stream.

17. The device of claim 15, wherein the received user input is an expanding pinch gesture applied to the touch screen, the expanding pinch gesture having initial touch points and final touch points, the instructions are further operative, when executed by the processor, to cause the device to:
   determine the selected spatial location based on the initial touch points; and
   determine the selected zoom factor based on a change in distance between touch points from the initial touch points to the final touch points.

18. The device of claim 15, wherein the instructions are further operative, when executed by the processor, to cause the device to:
   receive additional user input selecting an additional spatial location in the primary video stream; and
   identify an additional tracked object based on the additional spatial location;
   wherein the cropping and upscaling is based on the time-varying position of the identified tracked object and of the identified additional tracked object, and
   wherein the first cropped and upscaled video stream follows the identified tracked object and the identified additional tracked object at the selected zoom factor.

19. The device of claim 15,
   wherein the instructions are further operative, when executed by the processor, to cause the device to scale the zoomed video stream according to the selected zoom factor, and
   wherein display of the zoomed video stream comprises displaying the scaled zoomed video stream.

20. A method comprising:
receiving, from a server, a primary video stream;
receiving, from the server, tracking information for a plurality of tracked objects in the primary video stream, the tracking information indicating a time-varying position of each of the tracked objects;
displaying the primary video stream, including highlighting the plurality of tracked objects based on the received tracking information; and
in response to a received user input, the received user input controlling selection of (i) a spatial location in the primary video stream and the received user input controlling selection of (ii) a zoom factor change:
   identifying at least two tracked objects based on the selected spatial location;
   based on the time-varying positions of the identified tracked objects and the selected zoom factor change, cropping and upscaling the primary video stream to generate a first cropped and upscaled video stream that follows the identified tracked objects at the selected zoom factor change;
   displaying the first cropped and upscaled video stream;
   retrieving from the server a stored zoomed video stream corresponding to the identified tracked objects, wherein the zoomed video stream is of better quality than the first cropped and upscaled video stream; and
   switching from display of the first cropped and upscaled video stream to display of the zoomed video stream,
   wherein the plurality of tracked objects correspond to respective zoomed video streams stored in the server, and wherein the retrieved zoomed video stream is one of the zoomed video streams stored in the server.

* * * * *